US012283985B1

(12) United States Patent
Valdez et al.

(10) Patent No.: US 12,283,985 B1
(45) Date of Patent: *Apr. 22, 2025

(54) SYSTEMS AND METHODS OF MESH-BASED FAULT DETECTION IN PASSIVE OPTICAL NETWORKS

(71) Applicant: FRONTIER COMMUNICATIONS HOLDINGS, LLC, Dallas, TX (US)

(72) Inventors: John Valdez, Copper Canyon, TX (US); Bryan Pauling, Rochester, NY (US); Eduardo Flores, Frisco, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/805,833

(22) Filed: Aug. 15, 2024

Related U.S. Application Data

(63) Continuation of application No. 18/637,420, filed on Apr. 16, 2024, now Pat. No. 12,160,262.

(51) Int. Cl.
| | |
|---|---|
| *H04B 10/077* | (2013.01) |
| *H04B 10/272* | (2013.01) |
| *H04W 84/18* | (2009.01) |

(52) U.S. Cl.
CPC ....... *H04B 10/0771* (2013.01); *H04B 10/272* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,831,145 B2 | 11/2010 | Gao et al. | |
| 8,693,866 B1* | 4/2014 | Lam | H04B 10/071 398/16 |
| 2006/0222364 A1* | 10/2006 | Chung | H04J 14/0246 398/72 |
| 2007/0217788 A1* | 9/2007 | Gao | H04Q 11/0067 398/5 |
| 2008/0131114 A1* | 6/2008 | Jang | H04J 14/0226 398/13 |
| 2009/0129773 A1* | 5/2009 | Oron | H04J 14/0221 398/10 |

(Continued)

*Primary Examiner* — David W Lambert
(74) *Attorney, Agent, or Firm* — MARSHALL, GERSTEIN & BORUN LLP

(57) ABSTRACT

A PON system includes both a PON via which optical services are delivered and a wireless network overlaying the PON. The wireless network may be a self-organizing wireless mesh network, and may generally operate as a logical signaling pathway via which information regarding optical states/statuses of PON components and/or related information is delivered from the field to back-end servers of the PON system. Accordingly, the system may include multiple in-common nodes (e.g., OLTs, LMTUs, etc.) which are included in both the PON and the wireless network. Based on optical information received via the wireless network, the servers can localize the physical location of a PON fault to a particular geographical region of multiple regions serviced by the PON (in some cases narrowing the fault's physical location to a particular span, FDH, or optical terminal), and may dispatch a technician directly to the localized physical location to address the fault.

30 Claims, 6 Drawing Sheets

(56) References Cited

U.S. PATENT DOCUMENTS

| | | | |
|---|---|---|---|
| 2010/0135652 A1* | 6/2010 | Jiang | H04B 10/07 |
| | | | 398/10 |
| 2011/0255860 A1* | 10/2011 | Lee | G01M 11/3136 |
| | | | 398/10 |
| 2014/0056582 A1 | 2/2014 | Roberts | |
| 2014/0233938 A1 | 8/2014 | Kiess | |
| 2017/0033862 A1* | 2/2017 | Dupuis | H04B 10/07955 |
| 2018/0332351 A1 | 11/2018 | Lee | |
| 2020/0169457 A1 | 5/2020 | Xiao et al. | |

* cited by examiner

SYSTEMS AND METHODS OF MESH-BASED FAULT DETECTION IN PASSIVE OPTICAL NETWORKS

CROSS-REFERENCE TO RELATED APPLICATIONS

This application is a continuation of U.S. patent application Ser. No. 18/637,420 entitled "Systems and Methods of Mesh-Based Fault Detection in Passive Optical Networks" and filed on Apr. 16, 2024, the disclosure of which is hereby incorporated by reference herein in its entirety.

FIELD OF DISCLOSURE

This disclosure generally relates to passive optical networks and, more particularly to a wireless network which overlays a passive optical network and usage thereof to provide information about the passive optical network.

BACKGROUND

A conventional passive optical network (PON) includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT), an optical network unit (ONU), or some other type of network interface device (NID) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. In some arrangements, a fiber distribution terminal (FDT) may be additionally or alternatively utilized to connect feeder optical fibers to distribution optical fibers.

Typically, when a fiber cut or some other type of fault occurs in a PON, the network operations center (NOC) of the PON is notified of the loss of service on a per-LMTU basis, e.g., based on a received customer complaint and/or a detection of a loss of heartbeat messages between the central office and an LMTU. Typically, when the NOC receives notifications of loss of service at LMTUs, the NOC dispatches technicians to corresponding geographical locations of the indicated LMTUs and surrounding geographical areas to investigate a cause of the loss of service. However, the NOC does not have any knowledge as to the systemic extent of the effects of the fiber cut, and consequently the locations to which the technicians are dispatched may or may not be proximate to the location of the actual fiber cut. For example, a fiber cut of an optical fiber that optically connects an FDH to an OLT may affect a multiplicity of LMTUs that are dispersed over a large geographical region, and consequently multiple technicians may be dispatched to multiple locations within the large geographical region that are proximate to affected LMTUs even though the location of the fiber cut is distant from the various locations to which the technicians are dispatched. Further, in the field, the technicians must manually coordinate investigative efforts with each other be able to more specifically localized or narrow down the location of the fiber cut.

SUMMARY

The systems, methods, devices, and techniques described within this disclosure are generally directed to a Passive Optical Network (PON) system which includes both a passive optical network (PON) via which optical services are delivered to customers and a wireless network overlaying the PON. The wireless overlay network of the system may operate, in a general sense, as a logical signaling mechanism, pathway, or channel via which information regarding optical states or statuses of PON components and/or regarding optical access to the PON components (e.g., operational states or statuses, connectivity states or statuses, optical node or device states or statuses, etc.) may be delivered to back-end servers of the PON system, and the back-end servers may use received information pertaining to multiple LMTUs to detect faults within the PON and localize (e.g., narrow down the physical location) of a fault. To this end, the PON system may include one or more "in-common" nodes, each of which may simultaneously be or operate both as a node of the PON and as a node of the wireless overlay network. Via the in-common nodes and the wireless overlay network, the PON system may deliver PON node (e.g., optical node) statuses and/or other associated PON information to one or more back-end servers (e.g., periodically and/or non-periodically over time, upon the detection of a change in PON node status, etc.), and the back-end servers may utilize the received statuses and/or associated information to localize the physical location of a fault that has occurred within the PON and take mitigating action. For example, the back-end servers may localize the physical location of the fault to a particular geographical region of a multiplicity of geographical regions serviced by the PON. Indeed, in some cases, the back-end servers may localize the physical location of the fault to a particular compromised span of optical fiber, FDH, or optical terminal. Significantly, the information indicative of PON optical node states, statuses, and/or other associated information is able to be delivered to the back-end servers via the wireless overlay network even when various portions or components of the PON are unavailable, compromised, and/or not operating at full capacity or capability. Further, as the wireless overlay network may be self-organizing, the information indicative of PON optical states, statuses, and/or other associated information is able to be delivered to the back-end servers even when various portions or components of the wireless overlay network are unavailable, compromised, and/or not operating at full capacity or capability. As such, the novel and inventive techniques described herein allow a PON system to automatically, quickly, efficiently, and reliably determine the localized geographical area or physical location of a fault which has occurred within its PON network (e.g., to the faulty or compromised span, FDH, or optical terminal) without having to rely on customers to submit complaints and without needing to send multiple technicians to multiple locations in the field to collect information and manually coordinate collected data amongst the technicians for narrowing down the potential areas or locations at which the fault may have occurred. As such, delays in mitigating the fault are minimized. Indeed, in some instances, the back-end servers may immediately initiate one or more fault mitigation actions upon determining the localized geographical area of the fault.

In an embodiment, a system for fault localization in a Passive Optical Network (PON) includes one or more servers communicatively connected to a wireless mesh network overlaying the PON, where the wireless mesh network including a plurality of nodes. The plurality of nodes include a plurality of last mile termination units of the PON, and each last mile termination unit is configured to, upon a detection of a loss of optical connectivity of the each last mile termination unit with the PON, transmit, via the wireless mesh network, a signal indicative of the loss of optical connectivity of the each last mile termination unit with the PON. The one or more servers include one or more processors and one or more memories storing computer-executable instructions that, when executed by the one or more processors, cause the one or more servers to obtain, via the wireless mesh network, one or more signals indicative of respective losses of optical connectivity, with the PON, of two or more last mile termination units of the plurality of last mile termination units; based on the obtained one or more signals, map the two or more last mile termination units to a layout of components of the PON, the layout indicating interconnections between the components of the PON; based on the mapping, localize a physical location of a fault within the PON to a particular geographical region of a plurality of geographical regions among which the components of the PON are physically disposed; and cause an indication of the particular geographical region of the physical location of the fault within the PON to be provided to at least one of a user interface or another computing device.

In an embodiment, a method for localizing faults within a Passive Optical Network (PON) is performed at one or more servers communicatively connected to a wireless mesh network overlaying the PON, where the wireless mesh network includes a plurality of nodes, the plurality of nodes include a plurality of last mile termination units of the PON, and each last mile termination unit is configured to, upon a detection of a loss of optical connectivity of the each last mile termination unit with the PON, transmit, via the wireless mesh network, a signal indicative of the loss of optical connectivity of the each last mile termination unit with the PON. The method includes obtaining, by the one or more servers via the wireless mesh network, one or more signals indicative of respective losses of optical connectivity, with the PON, of two or more last mile termination units of the plurality of last mile termination units; based on the obtained one or more signals, mapping, by the one or more servers, the two or more last mile termination units to a layout of components of the PON, the layout indicating interconnections between the components of the PON; based on the mapping, localizing, by the one or more servers, a physical location of a fault within the PON to a particular geographical region of a plurality of geographical regions among which the components of the PON are physically disposed; and causing, by the one or more servers, an indication of the particular geographical region of the localized physical location of the fault within the PON to be provided to at least one of a user interface or another computing device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention and explain various principles and advantages of those examples.

Figure 1A:
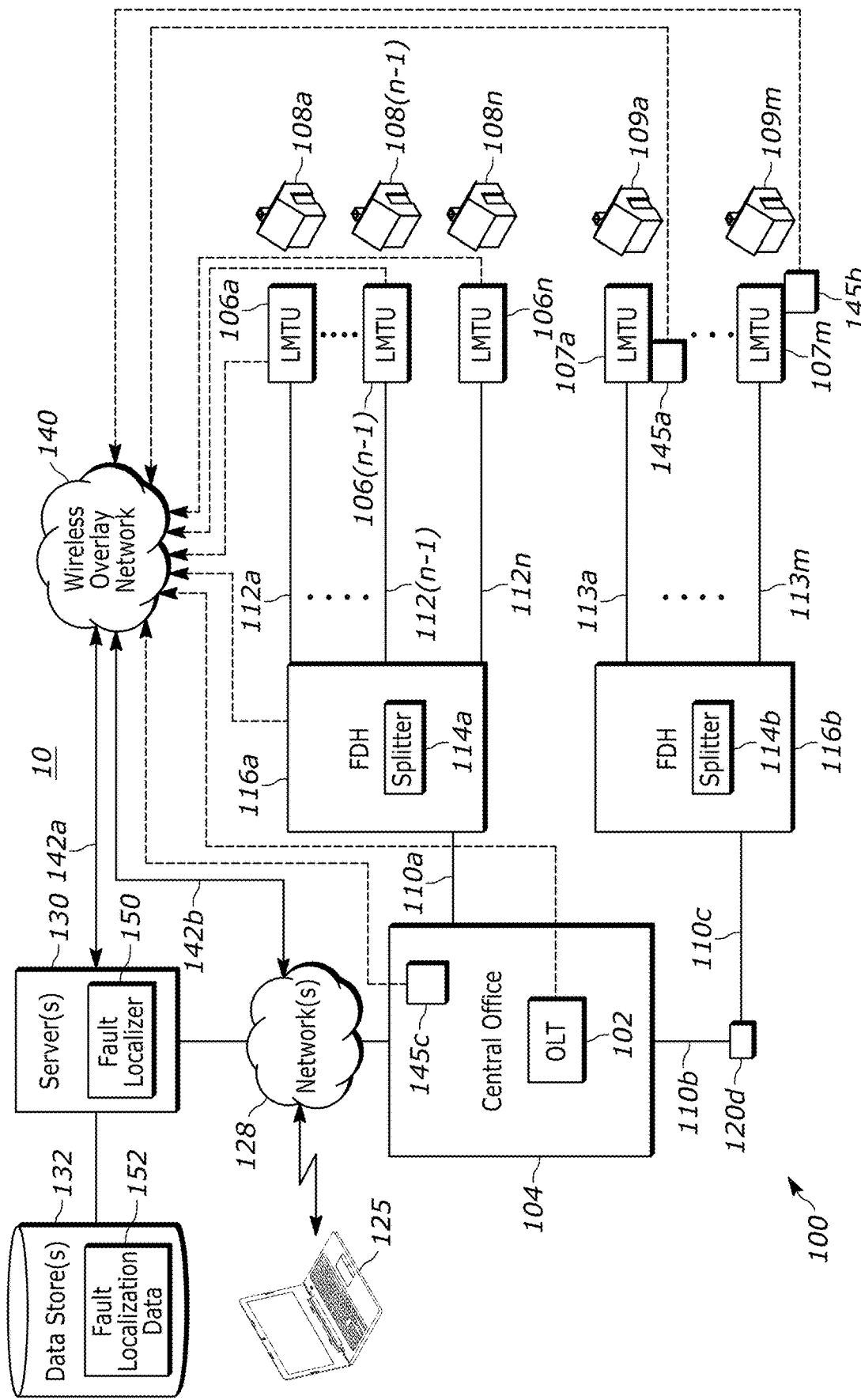
FIG. 1A is a high-level block diagram of an example Passive Optical Network (PON) system that includes a PON and a wireless overlay network, and in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Example Passive Optical Network (PON) System with PON and Wireless Overlay Network FIG. 1A is a block diagram of an example PON system 10 in which the systems, methods, and techniques of the present disclosure may be implemented. As shown in FIG. 1A, the example PON system 10 includes a PON 100 and a wireless network 140 overlaying the PON 100. The PON 100 includes one or more optical line terminals (OLTs) (an example one of which is designated by reference numeral 102) at a central location (e.g., at a central office 104) optically connecting to one or more last mile termination units (LMTUs) 106a, . . . , 106n at respective customer premises 108a, . . . , 108n. The last mile termination units 106a, . . . , 106n may be located outside and/or inside the customer premises or locations 108a, . . . , 108n. Each last mile termination unit 106a, . . . , 106n may be, for example, an optical network unit (ONU) or an optical network terminal (ONT). In some examples herein, the term "optical terminal" may generally refer to a last mile termination unit (e.g., an ONU or ONT) and/or to an OLT.

The example PON 100 is implemented using instances of point-to-multipoint topology. For example, in the example PON 100, a first feeder optical fiber from the OLT 102 (which is interchangeably referred to herein as an "F1 optical fiber 110*a*" or a "primary optical fiber 110*a*") serves the one or more last mile termination units 106*a*, . . . , 106*n* via respective distribution optical fibers 112*a*, . . . , 112*n* (which are interchangeably referred to herein as "F2 optical fibers 112*a*, . . . , 112*n*" or "secondary optical fibers 112*a*, . . . , 112*n*"). In the illustrated example, the first feeder optical fiber 110*a* is optically coupled to the plurality of last mile termination units 106*a*, . . . , 106*n* via an example one-to-many optical splitter 114*a* which is disposed, located, implemented, etc. in an example fiber distribution hub (FDH) 116*a*. In some arrangements, the FDH 116*a* is located within a geographic area (e.g., a neighborhood) such that the customer premises 108*a*, . . . , 108*n* are proximally close to the FDH 116*a*, and typically each of the customer premises 108*a*, . . . , 108*n* and respective last mile termination units 106*a*, . . . , 106*n* is disposed at a different optical distance from the FDH 116*a*. An "optical distance," as generally utilized herein, refers to a distance over which an optical signal travels or is delivered.

In embodiments, the PON 100 may or may not include additional feeder optical fibers and optical splitters for a plurality of additional customer premises. Moreover, a PON may or may not include a plurality of FDHs. For example, as shown in FIG. 1A, the example PON 100 includes a second feeder or primary optical fiber 110*b* from the OLT 102 that is optically coupled to another plurality of last mile termination units 107*a*-107*m* at respective customer premises 109*a*-109*m* via another many-to-one optical splitter 114*b* included in another fiber distribution hub 116*b* and via respective secondary optical fibers 113*a*-113*m*.

As utilized herein, the "components" of the PON 100 generally refer to the devices, nodes, and optical fibers of the PON 100, between and/or over which optical signals are delivered. For example, the components of the PON 100 shown in FIG. 1A may include the OLT 102, the FDHs 116*a*, 116*b*, the splitters 114*a*, 114*b*, the LMTs 106*a*-106*n* and 107*a*-107*m*, the optical fibers interconnecting the devices or nodes (e.g., the optical fibers 110*a*-110*b*, 112*a*-112*n*, and 113*a*-113*m*), one or more fiber distribution terminals (FDTs, not shown in FIG. 1A), and the LMTUs 106*a*-106*n*, 107*a*-107*m*. As utilized herein, the components of the PON 100 which are not optical fibers are generally referred to as "optical nodes" of the passive optical network 100, as such components are optically connected within the PON 100 (e.g., optically interconnected via at a some of the optical fibers 110*a*-110*b*, 112*a*-112*n*, and 113*a*-113*m* within the PON 100), and accordingly may receive optical signals from one or more other optical nodes of the PON 100 and/or transmit optical signals to one or more other optical nodes within the PON 100.

In some scenarios, an optical terminal (e.g., the OLT 102 and/or one or more the last mile termination units 106*a*-106*n*, 107*a*-107*m*) may transmit optical test signals and/or patterns, indication light, and/or other types of measurement signals into an optical fiber in response to control signals received from a computing device. For example, the OLT 102 and/or the one or more LMTUs 106*a*-106*n*, 107*a*-107*m* may receive control signals from a computing device 125 (e.g., a laptop, a computer, a tablet, a mobile phone, etc., which may or may not be a portable computing device) associated with a service technician or other agent of the PON system 10. In some examples, the computing device 125 controls an optical terminal of the PON 100 via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 1A).

Additionally and/or alternatively, control signals may be received from one or more servers 130 of the PON system 10 which may be used to manage the PON 100, the network(s) 128, the wireless overlay network 140, etc. Generally speaking, the one or more servers 130 may transmit signals to one or more PON components and/or receive operational and/or other types of data generated by one or more PON components to manage the PON 100, and the one or more servers 130 may transmit signals to one or more wireless overlay network components and/or receive operational and/or other types of data generated by one or more wireless overlay network components to manage the wireless overlay network 140. For example, the one or more servers 130 may include one or more processors and one or more tangible, non-transitory memories (not shown in FIG. 1A) storing thereon one or more sets of computer-executable instructions thereon which, when executed by the one or more processors of the server(s) 130, schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may be stored on and execute at the server(s) 130 and/or the server(s) may host one or more services to provide management, administrative, and/or test functionalities of various components of the PON 100. Accordingly, the one or more servers 130 may be interchangeably referred to herein as "PON servers 130."

Further, the one or more tangible, non-transitory memories of the one or more servers 130 may store a set of computer-executable fault localizer instructions 150 (e.g., "the fault localizer 150") that are executable by the one or more processors of the server(s) 130 to cause the one or more servers 130 to localize a fault within the PON 100 (e.g., localize or narrow down the physical location of a fault), as will be described in more detail elsewhere herein. In some implementations, respective instances of the fault localizer instructions 150 (or a subset of the fault localizer instructions 150) may be stored on one or more tangible, non-transitory memories of the computing device 125 and executable by one or more processors of the computing device 125 to localize a fault within the PON 100.

Various information and data associated with, utilized by, and/or generated by the PON 100 may be stored in the data stores 132 of the PON 100. For example, the data store(s) 132 may store records of customer contact events with a technical support organization supporting the PON 100, service call records, records of operating conditions and events which occurred, logbooks, and the like. Importantly, the data store(s) 132 may store information and/or data 152 related to fault localizing within the PON 100, e.g., information and/or data that is generated and/or utilized by the fault locator instructions 150. Additionally, the data store(s) 132 may store applications which may execute at the one or more PON servers 130, and/or which may be downloaded or otherwise provided to the technician computing device 125 for installation and execution thereon. For example, the data store(s) 132 may store the fault localizer instructions 150, and the one or more servers 130 may download different instances of the fault localizer instructions 150 (or subsets thereof, respective client applications, etc.) to execute at respective agent devices 125. Moreover, the data store(s) 132 may store data related to and/or indicative of fault localization within the PON 100. Further, the data store(s) 132 may store data indicative of performance, faults, diagnostics, statuses, states, and/or other data corresponding to the components of the system 100, and/or the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

As depicted in FIG. 1A, the example PON system 10 also includes a wireless overlay network 140 that includes a plurality of wireless nodes. Generally speaking, the wireless overlay network 140 serves as a logical signaling channel, pathway, or means of delivering optical node statuses (e.g., statuses of optical connectivity of optical nodes) and information pertaining to the components and operations of the passive optical network 100 to the one or more servers 130, and in particular when portions of the PON 100 are compromised or not available. As such, the wireless overlay network 140 may be communicatively connected (e.g., in wired and/or wireless manners) to the one or more servers 130 of the PON system 100, e.g., directly 142*a* and/or via the network(s) 128, as denoted by reference 142*b*. Each wireless node of the wireless network 140 includes one or more wireless transceivers which may support one or more wireless communication protocols, standards, and/or frequency bands such as, for example, short-range wireless protocols (e.g., Zigbee®, Bluetooth®, Wi-Fi®, and/or other short-range wireless protocols); VHF and UHF bands spanning 54 to 900 MHz; higher RF (radio frequency) bands such as the 2.4 GHz, 4.9 GHz, 5G, 6G, and 60 GHz frequency bands; IEEE 802.11 af and 802.11 ah compliant protocols for TV White Space communication; etc. Some wireless nodes of the network 140 may be unitary, physical wireless nodes in which one or more wireless transceivers are integrally included in a single physical device. Some wireless nodes may be unitary, logical wireless nodes in which one or more wireless transceivers are communicatively connected to a physical device, and the combination of the physical device and the communicatively connected wireless transceiver(s) operates and is identified as a single, logical wireless node within the wireless network 140. In some embodiments, at least some of the wireless nodes of the wireless network 140 may include or may be communicatively connected to software-defined radios (SDRs) that dynamically self-configure and/or are dynamically configured to utilize one or more wireless communication protocols, standards, and/or frequency bands supported by at least portions of the wireless network 140. For example, a first subset of wireless nodes of the wireless network 140 may be communicatively interconnected via a short-range wireless protocol, such as Zigbee; a second, mutually exclusive subset of wireless nodes of the wireless network may be communicatively interconnected via a different short-range wireless protocol, such as Wi-Fi; and both the first and the second subsets of wireless nodes may be communicatively connected to an SDR that receives signals from the first and second subsets via their respective short-range wireless protocols, and forwards contents of the received signals towards the one or more servers 130 via a longer-range wireless protocol, such as 900 MHz, 2.4 GHz, etc.

Typically, at least some of the wireless nodes of the wireless overlay network 140 are also (simultaneously) components of the PON 100, and examples of such nodes/components are denoted in FIG. 1A by the dashed, arrowed lines between the various nodes/components and the wireless overlay network 140. Accordingly, such nodes or components that are included in both the optical network of the PON 100 and in the wireless network 140 overlaying the PON 100 are generally and categorically referred to herein as "in-common nodes," as such nodes are shared by both the wireless overlay network 140 and the optical network of the PON 100. For example, the in-common nodes of the PON system 10 may include one or more LMTUs which have integral wireless transceivers, such as LMTUs 106*a*, 106(n-1), and 106*n*. For ease of reference, LMTUs which are configured to be and/or operating as in-common nodes of the PON system 109 are referred to interchangeably herein as "in-common LMTUs" or "in-common node LMTUs."

Additionally or alternatively, the in-common nodes may include other components of the PON 100 that have integral wireless transceivers, such as the FDH 116*a* and the OLT 102 as shown in FIG. 1A. Still, the PON system 10 may include at least some in-common nodes that are not integral or unitary devices. For example, as shown in FIG. 1A, some in-common nodes of the PON system 10 may be logical in-common nodes which include both an optical component of the PON 100 and a wireless device that is co-located (e.g., fixedly co-located) with the optical component but is not integral to the corresponding optical component, such as wireless device 145*a* associated with LMTU 107*a*, wireless device 145*b* associated with LMTU 107*m*, and wireless device 145*c* associated with central office 104. Each of such separate but co-located wireless devices 145*a*-145*c* may be communicatively connected (typically by using a direct physical, wired, or short-range wireless link or connection) to its respective PON component to thereby receive optical connectivity status (also interchangeably referred to herein as "optical status") of the communicatively connected PON component and/or other information from its respective PON component.

Additionally, with respect to LMTUs within the PON 100, it is noted that an in-common nodes of the PON system 10 may or may not be actively providing optical services within the PON 100 of the PON system 10, even while continuing to operate as a wireless node within the wireless overlay network 140 of the PON system 10. For example, each of the LMTUs 106*a*, 106(n-1), 106*n*, 107*a*, 107*m* may or may not be actively providing optical services at respective customer premises 108*a*, 108(n-1), 108*n*, 109*a*, 109*m* while continuing to be an active wireless node of the wireless overlay network 140. An LMTU may be inactive or not actively providing optical services at respective customer premises when, for example, the LMTU is optically faulty or compromised, the LMTU been decommissioned and/or deactivated from providing optical services, the LMTU that has been turned off with respective to providing optical services at the customer premises, e.g., due to the customer no longer using optical services at the customer premises, and/or for other reasons. As such, the LMTU may have an optical connection with the PON that is inactive or otherwise not being used.

Further, it is noted that although FIG. 1A illustrates the wireless nodes of the network 140 as including wireless nodes 106*a*, 106(n-1), 106*n*, 145*a*, 145*b*, 145*c*, 116*a*, and 102, this illustrated configuration is only exemplary. The wireless nodes of the wireless overlay network 140 of the PON 100 may include any number of LMTUs, FDHs, FDTs, OLTs, ONTs, ONUs, other types of Network Interface Devices (NIDs) and/or other components of the PON 100, and/or any number of wireless devices which are (fixedly) co-located with respective various components of the PON. In some arrangements, a wireless overlay network 140 may include one or more stand-alone wireless nodes which are not co-located with any PON component, e.g., one or more routing nodes, booster nodes, and/or other types of nodes which provide wireless coverage and connectivity within the wireless overlay network 140. Still further, not every component of the PON need be or need be co-located with a respective wireless node of the wireless overlay network 140.

In an example embodiment, the wireless network 140 overlaying the PON 100 in the system 10 may be a wireless mesh network and/or a wireless peer-to-peer network. In these embodiments, the routing of messages and/or packets within the wireless network 140 may be performed on a peer-to-peer and/or ad-hoc basis, e.g., by one or more wireless nodes of the wireless overlay network 140. For example, each node of at least some of the wireless nodes of the wireless network 140 (and in some implementations, a majority or even all of the nodes of the wireless network 140) may be configured to dynamically monitor wireless routing statuses, within the wireless network 140, of at least some other wireless nodes (e.g., of one or more neighboring nodes, one or more directly and communicatively adjacent nodes, or "next hop" nodes) via which the monitoring node may send messages to and/or receive messages from via the wireless network 140. A wireless routing status of a wireless node (also referred to herein as a "routing status" of the wireless node) may be indicative of a present ability or capability of a wireless node to route messages via the wireless overlay network 140. Monitoring other wireless nodes' routing statuses may include, for example, actively querying other nodes for their respective routing statuses, and/or passively receiving indications of current routing statuses of other nodes, where the passively received indications are not in response to a previous query. Examples of possible wireless node routing statuses within the wireless overlay network 140 may include "normal," "active," "inactive," "out-of-service," "unresponsive," "congested," and/or other desired categories of routing statuses. Based on the routing statuses of the wireless nodes of the network 140 which are being monitored by a wireless node, the wireless node may adjust its routing of messages and/or packets which are to be delivered to corresponding recipients via the wireless network 140. Recipients of messages/packets may be, for example, other nodes of the wireless network 140, the one or more servers 130, the computing device 125, and/or other recipients.

A wireless node may self-monitor its own wireless routing or wireless connectivity status. A wireless node which is monitoring its own routing/wireless connectivity status and/or various wireless nodes' routing/wireless connectivity statuses within the wireless overlay network 140 may transmit over the wireless network 140, an indication of its own routing or wireless connectivity status and/or of the routing/wireless connectivity statuses of any monitored wireless nodes, e.g., so that other wireless nodes within the network 140 may adjust their respective routing of messages within the wireless network 140 accordingly. For example, a wireless node may transmit (e.g., either by broadcast, point-to-multipoint, and/or point-to-point transmissions) an indication of its routing or wireless connectivity status periodically, on-demand, and/or when the wireless node detects a change in its wireless connectivity status. The indication of the routing/wireless connectivity status may include a timestamp corresponding to when the indicated wireless connectivity status was observed or detected by the wireless node. Not all wireless nodes of the wireless overlay network 140 need to monitor routing/wireless connectivity statuses of other wireless nodes, and not all wireless nodes of the wireless overlay network 140 need to use broadcasted transmissions to send node routing/wireless connectivity status information. For example, a first wireless node may send, in a point-to-point or point-to-multipoint manner, its current routing status within the wireless network 140 to a second wireless node which is operating as a status collection point. The second wireless node may also receive other routing statuses from other wireless nodes, e.g., in point-to-point, point-to-multipoint, and/or broadcast manners. The second wireless node may directly receive a routing status from a node to which the routing status pertains, and/or the second wireless node may indirectly receive a routing status via an intermediate node that is communicatively disposed, within the wireless network 140, between the second wireless node and the node to which the routing status pertains. At any rate, the second wireless node may collect such routing status information from a multiplicity of nodes and transmit (e.g., in a point-to-point, a point-to-multipoint, and/or a broadcast manner) collective routing information of the multiplicity of nodes to one or more recipients, such as other nodes of the wireless network 140, the one or more servers 130, the computing device 125, and/or other recipients.

In an embodiment, a message or signal that is received at the second wireless node and that includes an indication of a wireless connectivity or routing status of another wireless node may also include an indication of (e.g., a timestamp or other suitable indication corresponding to) when the other wireless node detected or observed its wireless connectivity/routing status, and the second wireless node may forward or otherwise provide an indication of the timestamp to the one or more recipients. In an embodiment, a message or signal that is received at the second wireless node and that includes an indication of a wireless connectivity or routing status of another wireless node may include an indication of a route or a path, within the wireless network 140, via which the wireless connectivity/routing status of the other wireless node was delivered from the originating, other wireless node to the second wireless node. For example, if the other wireless node detected a change in its wireless connectivity and sent a corresponding indication to node A, node A routed a corresponding indication to node B, and node B routed a corresponding indication to the second wireless node, then the signal received at the second wireless node would indicate that the route via which the indication of the wireless connectivity/routing status of the originating, other wireless node was delivered to the second wireless node includes the other wireless node→node A→node B→second wireless node. Similarly, if the second wireless node forwards or otherwise provides a corresponding indication of the wireless connectivity/routing status of the other wireless node to the one or more servers 130, the forwarded or provided indication would indicate that the route via which the wireless connectivity/routing status of the originating, other wireless node was delivered from the originating other wireless node to the one or more servers 130 includes the other wireless node→node A→node B→second wireless node→one or more servers 130. In a similar manner, other types of messages and/or signals whose contents are forwarded via the wireless network 140 (e.g., messages and/or signals that include optical connectivity statuses of optical nodes and/or other types of content) may include therein indications of the time at which the contents were initially transmitted from an originating node and/or indications of respective routing paths of the contents within the wireless network 140.

In an embodiment, a recipient of the routing/wireless connectivity statuses of wireless nodes within the network 140 may be the one or more servers 130 and/or the computing device 125. Additionally or alternatively, a recipient of the routing statuses of at least some of the wireless nodes within the wireless overlay network 140 may be another wireless node within the network 140. For example, the nearest neighbors of a particular wireless node may be the recipients of routing statuses that are detected by the particular wireless node. Each wireless node that is a recipient of other wireless nodes' routing statuses may include one or more routing tables and/or data stores in which the wireless node stores current routing statuses of other wireless nodes. Upon reception of indications of routing statuses of other wireless nodes, a wireless node may update its routing tables/data stores with current route status information of the other wireless nodes, and subsequently may utilize the contents of the routing tables/data stores to route, to one or more other wireless nodes, messages that the wireless node generates and/or receives via the wireless network 140. For example, a wireless node that receives routing statuses of three other wireless nodes may inform or otherwise notify six other nodes of the received (e.g., current) routing statuses of the three other wireless nodes as well as its own routing status, and the six other nodes may inform or otherwise notify still other nodes of the received routing statuses.

In some implementations, at least portions of the wireless overlay network 140 may be formed in a mesh, peer-to-peer, or ad-hoc manner. For example, the in-common LMTUs 106a, 106(n-1), and 106n may form a regional portion of the wireless overlay network 140 as or when needed. To illustrate using an example scenario, the in-common LMTU 106(n-1) becomes optically compromised and in response to becoming optically compromised, wirelessly broadcasts its compromised optical connectivity status. Neighboring wireless network nodes such as in-common LMTU 106a and 106n receive the broadcasted optical connectivity status of LMTU 106(n-1), and form an ad-hoc local area wireless network with each other and perhaps additional wireless nodes via which the optical connectivity status of LMTU 106(n-1) may be delivered towards the one or more servers 130, e.g., based on the respective wireless routing statuses of other nodes that are stored at each neighboring wireless network node. As such, the wireless overlay network 140 may operate at least partially as a self-organizing wireless mesh, peer-to-peer, or ad-hoc network, in embodiments. The wireless overlay network 140 may utilize one or more suitable wireless protocols over suitable wireless frequency bands, such as, for example, short-range wireless protocols (e.g., Zigbee®, Bluetooth®, Wi-Fi®, and/or other short-range wireless protocols); VHF and UHF bands spanning 54 to 900 MHz; higher frequency bands such as the 2.4 GHz, 4.9 GHz, 5G, 6G, and 60 GHz frequency bands; IEEE 802.11 af and 802.11 ah compliant protocols for TV White Space communication; etc. For instance, different portions of the wireless overlay network 140 may utilize different wireless protocols via which nodes of the different portions communicate with each other.

Figure 1B:
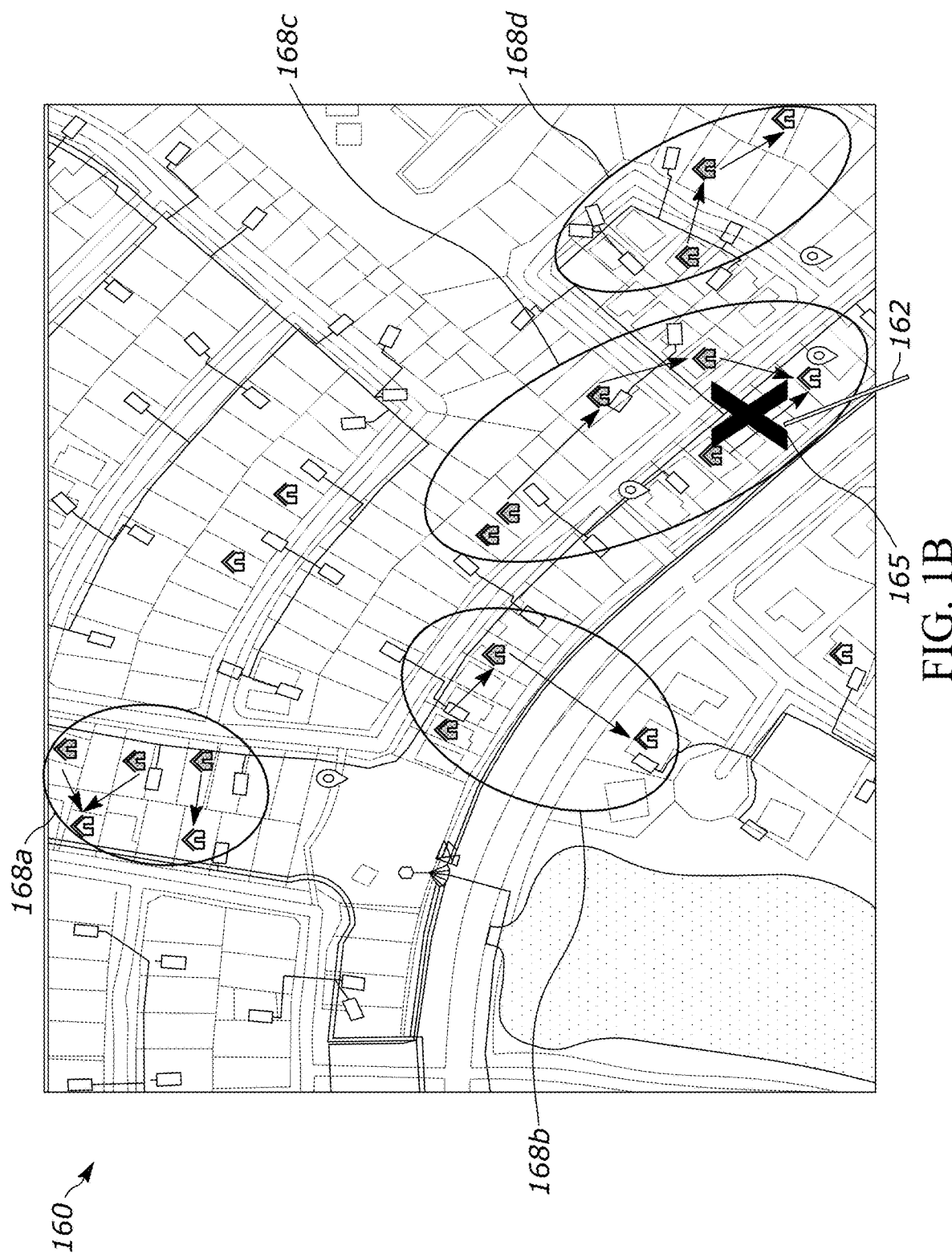
FIG. 1B depicts an example scenario in which at least some of the systems, methods, and/or techniques of the present disclosure are illustrated.

Example Scenario in a Passive Optical Network (PON) System with PON and Wireless Overlay Network FIG. 1B illustrates an example scenario in which at least some of the systems, methods, and techniques described herein may be utilized. For clarity of illustration, and not for limitation purposes, FIG. 1B is described herein with simultaneous reference the PON system 10 of FIG. 1A. FIG. 1B depicts a bird's eye view graphical map 160 of a neighborhood in which a PON service provider provides optical services to customers via the PON system 10. Optical services are delivered from a central office to various customer premises within the neighborhood (e.g., various endpoint destinations) via one or more primary optical fibers, including primary optical fiber 162 shown in FIG. 1B. Primary optical fiber 162 is optically connected to one or more FDHs (not shown) located throughout the neighborhood, and various distribution optical fibers (not shown) optically connect the FDHs to end-point destinations of the optical services. Each of the house icons on the map 160 represents an end-point destination or customer premises to which the PON 100 of the PON system 10 may provide optical services. As such, each of the locations represented by the house icons have a respective LMTU (not shown) that is fixedly connected at the location and into which a distribution optical fiber is received, where the received distribution optical fiber optically connects the LMTU to one of the FDHs located in the neighborhood (not shown) and thus to a corresponding OLT 102 (not shown). In FIG. 1B, the LMTUs disposed at the end-point destinations are in-common nodes of the PON system 100. For example, some of the LMTUs may be physical, integral, in-common LMTUs, and some of the LMTUs may be logical in-common LMTUs (e.g., in-common nodes that comprise an LMTU and a fixedly connected wireless device, such as previously described).

In the example scenario depicted in FIG. 1B, the primary optical fiber 162 is cut 165, and the darkened house icons represent end-point destinations at which optical services are compromised due to the cut 165. Upon each of the in-common nodes corresponding to the darkened house icons detecting compromised optical services, each of the in-common nodes corresponding to the darkened house icons may wirelessly communicate with neighboring in-common nodes to form a local area wireless mesh network via which member nodes may share/send current optical node statuses, other related optical information, and wireless node statuses amongst the nodes of the local area wireless mesh network and/or to at least a portion of the wireless overlay network 140 in which the local area wireless mesh network is included. As shown in FIG. 1B, four local area wireless mesh networks 168a, 168b, 168c, 168d are formed responsive to the detection of the optical compromise, and each local area wireless mesh network 168a-168d may determine a viable route or pathway towards the one or more back-end servers 130 of the PON system 10 via which optical nodes statuses and other related optical information may be delivered from the local area wireless mesh network 168a-168d to the back-end servers 130. For example, each local area wireless mesh network 168a-186d may determine a viable route or pathway towards the one or more back-end servers 130 based on the current wireless node statuses known to the in-common nodes of each local area wireless mesh network 168a-168d and/or neighboring nodes which are excluded from the local area wireless mesh network 168a-168d (e.g., as stored in respective routing tables at the respective in-common nodes of each local area wireless mesh network 168a-168d). In some cases, a neighboring node may be included in another local area wireless mesh network. Further, in some situations, optical node statuses and other related information may be collected and consolidated at various wireless nodes within the wireless mesh network 140 for more efficient delivery towards the one or more servers 130. The one or more back-end servers 130 may utilize the received optical connectivity statuses and related information from the local area wireless mesh networks 168a-168d to narrow down, localize, and/or in some cases, determine a component-level location of the cut 165. An indication of the determined location may be displayed on a user interface, such as represented by the "X" on the map 160. In some situations, the one or more back-end servers 130 may dispatch a service technician to the localized or determined physical location, and may provide the graphical map 160 to the service technician along with supporting information, where the supporting information may be determined based at least in part of the optical node statuses and other related information received at the servers 130 via the wireless mesh network 140.

Figure 2:
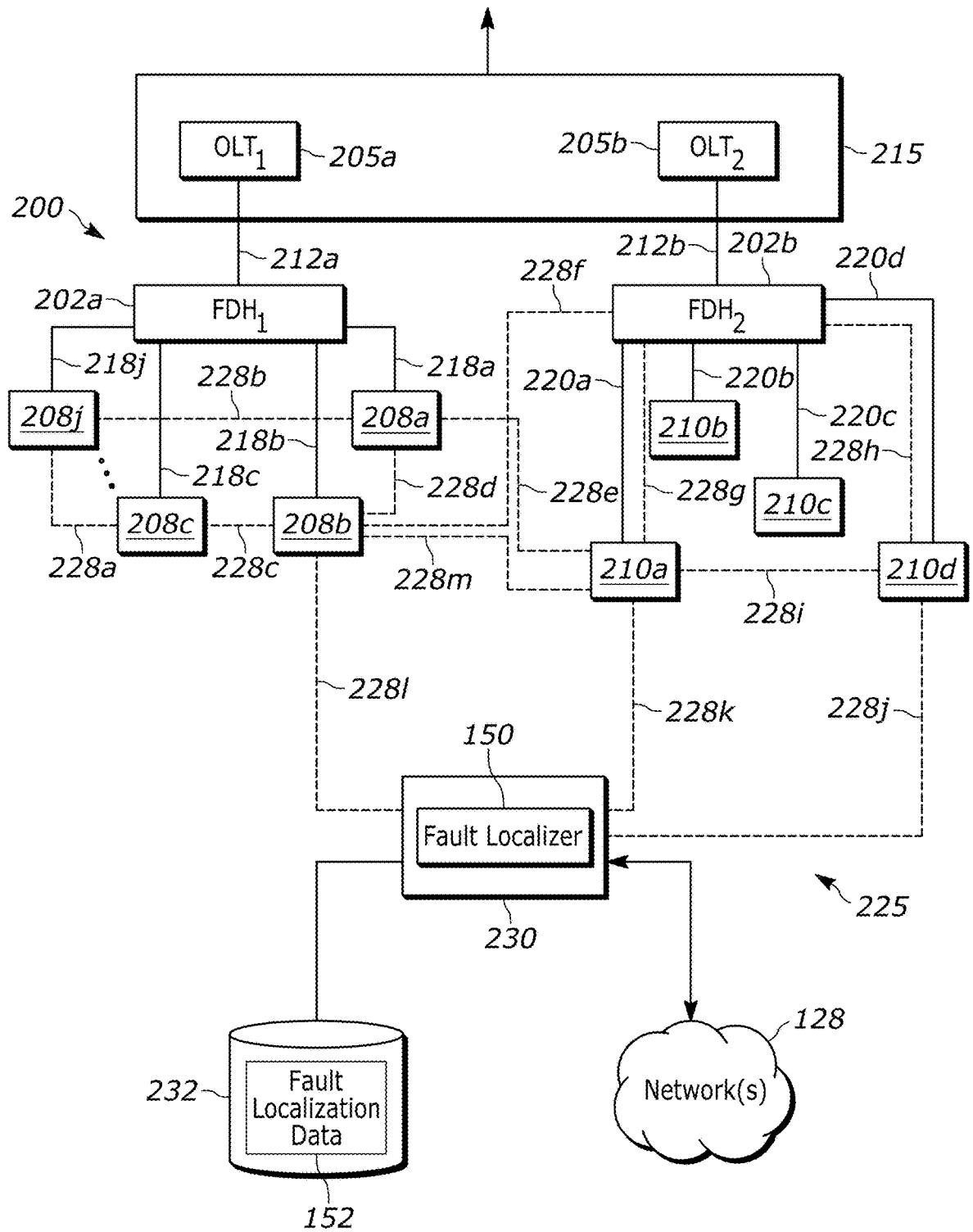
FIG. 2 is a block diagram of a network-based view of an example PON system that includes a PON network and a wireless overlay network, and in which the systems, methods, and/or techniques of the present disclosure may be implemented.

Example Passive Optical Network (PON) System with PON and Wireless Overlay Network—Network-Based View FIG. 2 is a block diagram of a network-based view of an example PON system 20 in which the systems, methods, and techniques of the present disclosure may be implemented. As shown in FIG. 2, the example PON system 20 includes a PON 200 and a wireless network 225 overlaying the PON 200. The PON 200 may include one or more FDHs 202, each of which may optically connect to a respective OLT 205 and to one or more respective last mile termination units 208, 210. As depicted in FIG. 2, the PON 200 includes an $FDH_1$ 202a that is optically connected to $OLT_1$ 205a via a feeder optical fiber 212a. The PON 200 also includes an $FDH_2$ 202b that is optically connected to $OLT_2$ 205b via a feeder optical fiber 212b. $OLT_1$ 205a and $OLT_2$ 205b may be physically located in one or more central office locations 215, and may or may not be co-located in a same physical location. As also depicted in FIG. 2, $FDH_1$ 202a is optically connected to optical nodes 208a-208j via various distribution optical fibers 218a-218j, and $FDH_2$202b is optically connected to multiple optical nodes 210a-210d via various distribution optical fibers 220a-220d. Optical nodes 208a-208j and 210a-210d may include at least one last mile termination unit disposed at respective customer locations serviced by the PON 200, and in most (but not all) implementations, a majority of the optical nodes 208a-208j and 210a-210d of the PON 200 may be last mile termination units. In some implementations, the optical terminals 208a-208j and 210a-210d may include at least one optical terminal that is not a last mile termination unit, such as a fiber distribution terminal, a booster, a router, etc. Of course, $FDH_1$ 202a, $FDH_2$ 202b, $OLT_1$ 205a, and $OLT_2$ 205b are also optical nodes of the PON 200.

Accordingly, the PON system 20 includes at least one passive optical network 200, where the PON 200 includes a plurality of optical nodes 202a, 202b, 205a, 205b, 208a-208j, and 210a-210d which are optically connected via a plurality of optical segments (also interchangeably referred to herein as optical links, optical fibers, and/or optical communication links) 212a, 212b, 218a-218j, and 220a-220d. Of course, the passive optical network(s) 200 of the PON system 20 may include other optical nodes and/or other optical segments which are not depicted in FIG. 2, such as one or more routers, fiber distribution terminals, optical splitters, repeaters, boosters, etc. For ease of reference, in FIG. 2 the optical links of the PON 200 are denoted by solid lines.

The PON system 20 also includes one or more wireless overlay networks 225. As depicted in FIG. 2, the one or more wireless overlay networks 225 of the system 20 include a plurality of wireless nodes 202b, 208a-208c, 208j, and 210a-210d which are wirelessly connected via a plurality of wireless links 228a-228m (also interchangeably referred to herein as wireless communication links 228a-228m). The wireless network(s) 225 are generally referred to herein as "overlay" wireless networks as the wireless networks 225 share nodes in common with the passive optical network(s) 200. That is, a particular node of the PON system 20 may be an in-common node of the system 20, where the in-common node operates both as an optical node of the PON 200 of the system 20, and as a wireless node of the wireless overlay network(s) 225 of the system 20, as is discussed in more detail elsewhere herein. In FIG. 2, nodes 202b, 208a-208c, 208j, 210a, and 210d are depicted as being in-common nodes. In some implementations, the wireless overlay network(s) 225 of the PON system 20 may include other wireless nodes and/or wireless links which are not depicted in FIG. 2, such as one or more wireless routers, wireless repeaters, wireless boosters, etc. For ease of reference, in FIG. 2 the wireless links of the wireless overlay network(s) 225 are denoted by dashed lines.

Generally speaking, the wireless network(s) 225 are generally referred to herein as "overlay" wireless networks, at least because the wireless networks 225 share one or more in-common nodes with the passive optical network(s) 200, e.g., the in-common nodes 202b, 208a-208c, 208j, 210a, and 210d. Thus, within the system 20, a particular node may be configured and operate as both a passive optical network node and a wireless network node, as is discussed in more detail elsewhere herein. In some configurations of the system 20 (not depicted in FIG. 2), at least some of the wireless nodes may be included in the wireless overlay network(s) 225 of the system 20 while being excluded from the passive optical network 200 of the system 20. Such wireless-only nodes may include, for example, wireless routers, signal boosters, etc. In some configurations of the system 20, at least some of the optical nodes may be included in the passive optical network 200 of the system 20 while being excluded from the wireless network(s) 225 of the system 20. Such optical-only nodes may include, for example, $FDH_1$ 202a, OLTs 205a, 205b, and/or other types of optical nodes such as optical splitters, FDTs, etc.

At any rate, the one or more wireless overlay network(s) 225 of the PON system 20 may be communicatively connected to one or more servers 230 that service the wireless overlay network(s) of the PON system 20. The wireless network servers 230 may be communicatively connected with the one or more PON servers 130 of FIG. 1A. For example, the wireless network servers 230 may be communicatively connected to the one or more PON servers 130 in a wired and/or wireless manner. In some embodiments, at least a portion of the wireless network server(s) 230 may be integral with the one or more PON servers 130, so that an integral set of back-end servers services the PON system 20.

The one or more wireless network servers 230 may include one or more processors and one or more tangible, non-transitory memories (not shown in FIG. 2) which, in some embodiments, store a set of computer-executable fault localizer instructions 150, such as in embodiments in which the wireless network servers 230 and the one or more PON servers 130 are an integral set of servers. In these embodiments, the fault localizer instructions 150 may be executable by the one or more processors of the server(s) 230 to cause the one or more servers 230 to localize or narrow down/ narrow in on a physical location of a fault within the PON 100, as will be described in more detail elsewhere herein. Additionally, the PON system 20 may include one or more data store(s) 232, which may store information and/or data 152 related to fault localizing within the PON 200, e.g., information and/or data that is generated and/or utilized by the fault locator instructions 150. Further, the data store(s) 232 may store applications which may execute at the one or more PON servers 230, and/or which may be downloaded or otherwise provided to the technician computing device 125 for installation and execution thereon.

The one or more wireless network servers 230 may monitor, administrate, test, and otherwise manage the one or more wireless networks 225 of the PON system 20, as well as communicate information about the wireless overlay network(s) 225 to the PON servers 130 and/or receive, from the PON servers 130, information, commands, and/or instructions related to the wireless overlay network(s) 225. Additionally, the wireless network servers 230 may log, historize, and/or otherwise store data generated by and associated with the wireless overlay network(s) 225 of the system 20, e.g., in one or more data stores 232. Still further, the wireless network servers 230 may be communicatively connected to the central office 215, e.g., via the one or more networks 128.

Similar to the wireless overlay network 140, the wireless overlay network(s) 225 may be a wireless mesh network and/or a wireless peer network, in embodiments. That is, the wireless overlay network(s) 225 may operate at least partially as a self-organizing network, e.g., for the routing of messages and/or packets via the wireless overlay network 225 to designated recipients. The wireless overlay network(s) 225 may utilize one or more suitable wireless protocols over suitable wireless frequency bands, such as, for example, 900 MHz or other low-band spectrums, 2.4 GHz, etc.

In an embodiment, the PON system 20 may be at least partially included in the PON system 10 of FIG. 1A. For example, the PON 200 may be at least partially included in the PON 100, and/or the wireless overlay network 225 may be at least partially included in the wireless overlay network 140. Additionally or alternatively, the one or more wireless network servers 230 may be at least partially (or, in some cases, entirely) included in the one or more PON servers 130, the data stores 232 may be at least partially (or in some cases, entirely) included in the data stores 132, the FDHs 202a, 202b may be the FDHs 116a, 116b, the OLT 205a or 205b may be the OLT 102, the central office 215 may be at least partially (or, in some cases, entirely) included in the central office 104. Further, in embodiments, at least some of the nodes 208a-208j and 210a-210d may include at least some of the LMTUs 106a-106n and 107a-107m.

In other embodiments, the PON system 20 may be included or implemented in PON systems other than the PON 10.

Example In-Common Node of a Passive Optical Network System

Figure 3:
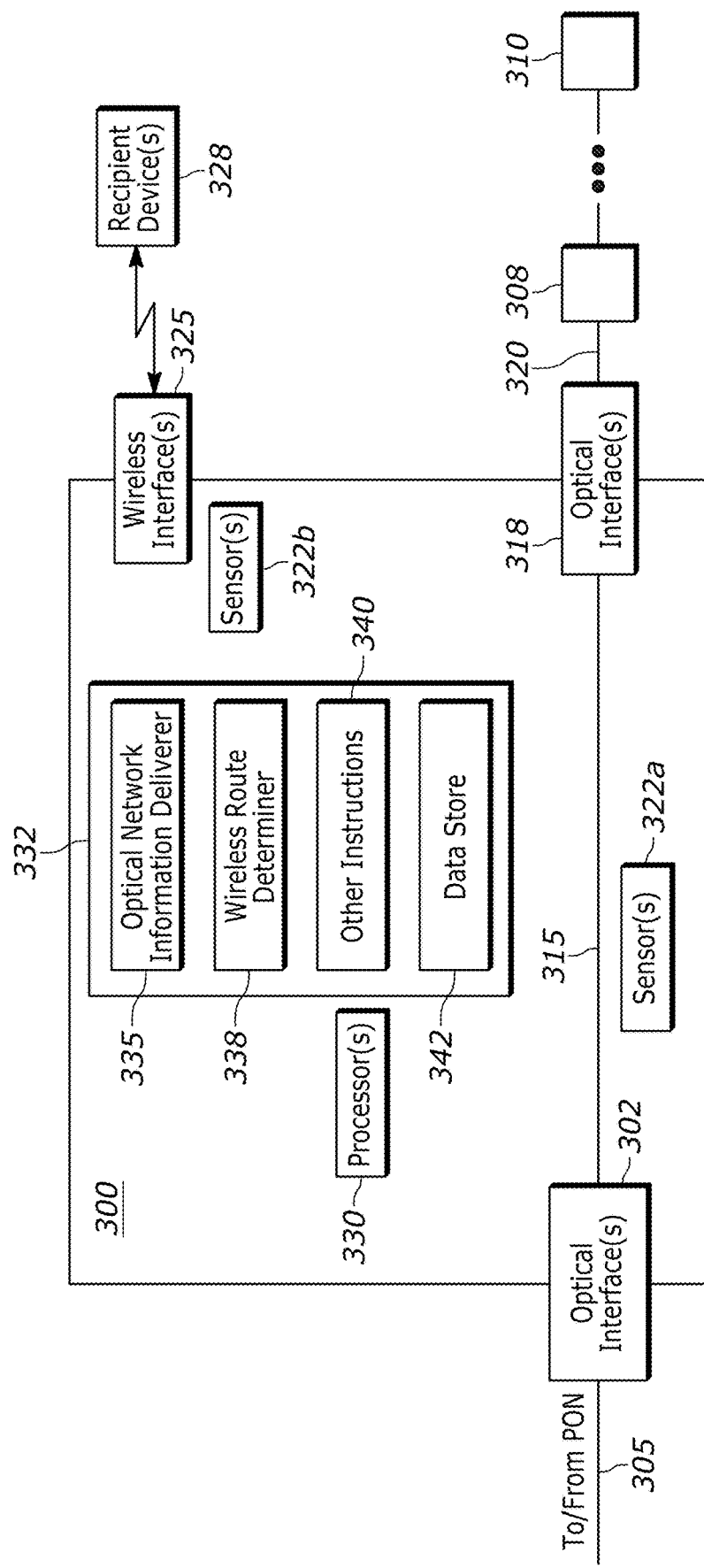
FIG. 3 is a high-level block diagram of an example in-common node which may be utilized in the PON system of FIG. 1A and/or FIG. 2.

Turning now to FIG. 3, FIG. 3 depicts a high-level block diagram of an example in-common node 300 which may be utilized in a PON system that includes both a PON and a wireless overlay network. For example, the in-common node 300 may be an in-common node of the PON system 10 or of the PON system 20. Generally speaking, the node 300 is categorically referred to herein as an "in-common" node of a PON system as the node is part of both the passive optical network of the PON system and the wireless overlay network of the PON system. For example, the in-common node 300 may simultaneously be and/or operate as both a node of a passive optical network of a PON system and a node of a wireless network of the PON system. For instance, in FIG. 1A the OLT 102, the LMTUs 116a, 106a, 106(n–1), and 106n, the combination of LMTU 107a and wireless device 145a, the combination of LMTU 107m and wireless device 145b, and the combination of central office 104 and wireless device 145c may be different instances of the in-common node 300, and in FIG. 2 the nodes 202b, 208a-208c, 208j, 210a, and 210d may be different instances of the in-common node 300.

For purposes of illustration, and not for limitation purposes, the in-common node 300 is described below as being optically disposed, within a passive optical network, between an OLT and a target or destination LMTU. However, the techniques, features, and principles discussed with respect to the in-common node 300 may be easily applied to in-common nodes which are optical endpoints within a passive optical network, such as LMTUs (e.g., LMTUs 106a, 106(n–1), 106n of FIG. 1A), OLTs (e.g., OLT 102 of FIG. 1A, OLTs 205a, 205b or FIG. 2), and/or to other types of optical endpoints of a passive optical network. Additionally for purposes of illustration, and not for limitation purposes, the in-common node 300 is described herein with simultaneous reference to the PON system 10 of FIG. 1A. However, it is understood that instances of the in-common node 300 may be included in any PON system that includes both a PON and a wireless overlay network, such as the PON system 20 and/or other such PON systems.

As discussed above, the in-common node 300 may be or may include an optical node of the passive optical network 100 of the PON system 10. Accordingly, and as depicted in FIG. 3, the in-common node 300 may include an optical interface 302 (e.g., a "network-facing," "upstream," or "incoming" optical interface 302) that receives an optical fiber 305 of the PON 100 (e.g., an "incoming" or "distribution" optical fiber 305). The incoming optical fiber 305 may optically connect the node 300 to the PON 100, e.g., directly to the OLT 102, to the OLT 102 via a fiber distribution hub 116a, 116b that is optically connected to the OLT 102, to the OLT 102 via one or more additional or alternative types of optical nodes, etc. In some embodiments (not shown in FIG. 3), an in-common node 300 may include multiple upstream-facing optical interfaces 302, each of which receives a respective incoming optical fiber 305.

Generally speaking, the in-common node 300 may receive, via the incoming optical fiber 305 and the incoming optical interface 302, optical signals that are transmitted from the central office 104, e.g., via a corresponding OLT 102, and the in-common node 300 may transmit or deliver the received optical signals to a recipient or receiving optical node 308 of the PON 100. The received optical signals may include content of various optically based services that are delivered via the PON 100 for eventual reception and consumption at a destination or target optical endpoint 310, which is interchangeably referred to herein as a "destination node 310" or a "target node 310." As such, the destination node or endpoint 310 may be an LMTU, such as one of the LMTUs 106, 107. In some situations, the recipient optical node 308 may be the destination node or endpoint 310 (not shown in FIG. 3), and in some situations, the recipient optical node 308 may be an optical node which is optically disposed in between the in-common node 300 and the destination node or endpoint 310 (such as shown in FIG. 3). As generally utilized and/or referred to herein, optical nodes that are optically disposed between the central office 104 and the in-common node 300 are referred to optical nodes that are "upstream" of the in-common node 300, and nodes that are optically disposed between the in-common node 300 and the destination node 310 are referred to as optical nodes that are "downstream" from the in-common node 300. For example, the recipient node 308 and the target node 310 are illustrated in FIG. 3 as being downstream of the in-common node 300.

The incoming optical signals that are received via the optical fiber 305 and the optical interface 302 of the in-common node 300 may include content such as payload of optical services which are to be consumed by customers, signaling related to the optical services, metadata for the payload and signals of the optical services, etc. For example, the optical signals that are received at the node 300 via the optical fiber 305 and the upstream optical interface 302 may include payload data and signaling/metadata for IPTV services, RF video services, and/or other optical services that are delivered over the PON 100. Generally, different services may be delivered over the PON 100 by utilizing respective bands of optical wavelengths supported by the PON 100. In an example implementation, a first service may utilize optical wavelength bands 1260-1543 nm and 1573-1650 nm for delivery of its respective payload and signaling content, and a second service may utilize optical wavelength bands 1553-1565 nm for delivery of its respective payload and signaling content. Of course, other services may utilize other respective optical wavelength bands. In some situations, in addition to payload and signaling/metadata of provided services, optical signals that are transmitted via the PON 100 for delivery to the destination node 310 via the incoming optical fiber 305 and the in-common node 300 may include signaling and/or information pertaining to the PON 100 itself and/or to components of the PON 100 (e.g., signaling and information other than the signaling and information of the delivered services). For example, the server(s) 130, the portable computing device 125, and/or the OLT 102 may send, via the optical fiber 305 and the in-common node 300, optical control signals, optical test signals, etc. to the destination endpoint 310 and/or to other optical nodes which are optically disposed downstream of the in-common node 300. Said non-service-specific signals may be delivered over the same or different wavelength bands as those utilized to provide services to the destination endpoint 310. Indeed, the PON 100 (including the incoming optical fiber 305) may support a plurality of optical wavelength bands including, for example: 100-400 nm, 630-670 nm, 1260-1280 nm, 1284-1288 nm, 1290-1310 nm, 1340-1344 nm, 1356-1360 nm, 1530-1565 nm, 1575-1581 nm, 1596-1603 nm, and/or 1613-1650 nm, to name a few, at least some of which may be utilized to provide signaling and/or information/content of services to endpoint locations, and at least some of which may be utilized to provide non-service signaling and/or information/content to endpoint locations.

Typically, signals that are received at the upstream optical interface 302 of the in-common node 300 may be passed through 315 the node 300, e.g., from the upstream optical interface 302 through 315 the node 300 to another optical interface 318 (e.g., a "local-facing," "downstream," or "outgoing" optical interface 318) for delivery, via an optical fiber 320 received into the optical interface 318, to the downstream recipient node 308 and, for some optical signals, eventually to the destination node 310. Such signals may include optical signals that the PON 100 utilizes to provide optical-based services to the destination node 310. For example, the PON 100 may provide content (e.g., payload and signaling/metadata) of IPTV services to the destination node 310 (e.g., via the in-common node 300 and the downstream recipient node 308) by utilizing optical light in the 1260-1543 nm and 1573-1650 nm wavelength bands and, as such, optical light of these wavelength bands may be passed through 315 the in-common node 300 to the downstream recipient node 308 via the downstream optical interface 318 and the optical fiber 320. Additionally or alternatively, the PON 100 may provide control signals, test signals, etc. that are generated by the server(s) 130, the agent computing device 125, the OLT 102, etc. that are related to the testing, performance, and administration of various PON components by utilizing optical light in the 1260-1543 nm and 1573-1650 nm wavelength bands and, accordingly, such PON-related signals may also be passed through 315 the in-common node 300 for eventual delivery to the target downstream PON component, e.g., the destination node 310 or some other downstream optical node.

As previously discussed, the in-common node 300 may operate both as an optical node of the passive optical network of the PON system and as a wireless node of a wireless network of the PON system, e.g., simultaneously during normal operations. For example, in addition to being an optical node of the passive optical network 100 of the PON system 10, the in-common node 300 may also be a wireless node of the wireless network 140 of the PON system 10. Accordingly, as depicted in FIG. 3, in addition to the optical interfaces 302, 318, the in-common node 300 may also include one or more wireless interfaces 325 which the in-common node 300 can utilize to wirelessly transmit messages and/or signals to one or more other wireless devices 328 and to wirelessly receive messages and/or signals from the one or more other wireless devices 328. The one or more other devices 328 may include, for example, other wireless nodes of the wireless network 140, which may include one or more other in-common nodes and/or one or more other wireless nodes of the network 140 that are not in-common nodes. In some situations, the one or more other wireless devices 328 may include one or more devices which are excluded from the wireless overlay network 140, such as a wireless portable computing device 125 (e.g., that is being utilized by an agent of the PON). The one or more wireless interfaces 325 may include respective wireless transceivers and radios which operate at various radio frequency (RF) wireless communication frequency bands or spectrums such as, for example, 900 MHz, 2.5 GHz, and 5.2 GHz, and/or other RF communication frequency bands such as those used for Wi-Fi, near-field communications (NFC), Bluetooth, infrared, etc., to name a few.

As further shown in FIG. 3, the in-common node 300 may include one or more processors 330 and one or more tangible, non-transitory memories 332 storing one or more sets of computer-executable instructions 335, 338, 340 (also referred to herein as machine-readable instructions 335, 338, 340) that are executable by the one or more processors 330 to implement the techniques described herein. For example, the machine-readable instructions 335, 338, 340, when executed by the one or more processors 330, may cause the in-common node 300 to perform at least portions of the methods described elsewhere herein. The one or more tangible, non-transitory memories 332 may also include a data store 342 which stores data utilized and/or generated by instructions 335, 338, 340, such as data formed and/or used during execution, by the processor(s) 330, of the machine-readable instructions 335, 338, 340 stored on the memories 332.

The one or more processors 330 may be implemented using hardware, and may include a semiconductor based (e.g., silicon-based) or other suitable type of device. The one or more processors 330 may include, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the one or more processors 330 may be a field programmable gate array (FPGA), an application specific integrated circuit (ASIC), etc. that implements operations of the example methods described herein without executing instructions.

The one or more memories 332 may be accessible by the one or more processors 330 (e.g., via one or more memory controllers). Example memories 332 include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions 338, 338, 340 corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the in-common node 300 to provide access to the machine-readable instructions stored thereon.

To perform at least some of the operations represented by embodiments of the techniques and methods described in this disclosure such as (but not limited to) fault localization within the PON system 10, the example in-common node 300 includes an optical network information deliverer 335, a wireless route determiner 338, and optionally other instructions 340, each of which may include a respective set of computer-executable instructions that are stored on the memories 332 and executable by the one or more processors 330 of the node 300. Of course, this delineation between the sets of instructions 335, 338, and 340 is for clarity of explanation only and not limitation purposes, as any two or more of the sets 335, 338, 340 may be included in an integral set of computer-executable instructions.

Generally speaking, the optical network information deliverer 335 of the in-common node 300 may determine and transmit, towards the one or more servers 130 via the wireless interface 325 and the wireless mesh network 140, information indicative of current and/or changed optical node statuses of the in-common node 300 and optionally of other optical nodes of the optical network 100. A status of an optical node may be indicative of the optical operational capabilities of the optical node within the PON 100. Examples of optical node statuses may include "normal," "active," "updated," "upgraded," "inactive," "out-of-service," "not receiving optical signals," "receiving compromised optical signals," "unable to receive optical signals," "unable to transmit optical signals," and/or other desired categories of optical node statuses. In some embodiments, in conjunction with transmitting the information indicative of current and/or changed optical node statuses, the optical network information deliverer 335 may also transmit, e.g., towards the one or more servers 130 via the wireless interface 325 and the wireless mesh network 140, an indication of the specific band of optical wavelengths to which the current and/or changed optical node statuses apply.

In some situations, in addition to optical connectivity statuses of optical nodes, the optical network information deliverer 335 may determine and transmit (e.g., towards the one or more servers 130 via the wireless interface 325 and the wireless mesh network 140) indications of information related to and/or associated with the optical connectivity status of the in-common node 300 optically operating within the PON 100 and optionally related to and/or associated with the optical connectivity statuses of other optical nodes operating within the PON 100. Such related information may indicate, for example, that the in-common node 300 is not receiving any optical signals at all from the PON 100, that the in-common node 300 is receiving compromised or intermittent optical signals from the PON 100, that the in-common node 300 is not receiving (or not reliably receiving) expected heartbeat messages from another optical node, and the like. In some embodiments, in conjunction with transmitting the information related to optical nodes, the optical network information deliverer 335 may also transmit, e.g., towards the one or more servers 130 via the wireless interface 325 and the wireless mesh network 140, an indication of the specific band of optical wavelengths to which the related information applies.

As is described in more detail elsewhere in this disclosure, the one or more servers 130 may receive, via the wireless overlay network 140, optical connectivity statuses of optical nodes of the PON 100 and/or information related to and/or associated with the optical nodes of the PON 100, where the received optical statuses and/or related information may respectively pertain to multiple different optical nodes. The one or more servers 130 and may utilize the received optical node statuses and/or related information to determine an occurrence of a fault within the PON 100 and to localize the physical location of the fault within the PON 100, e.g., so that technicians can be efficiently dispatched directly to the localized physical location to address or mitigate the fault.

The in-common node 300 may self-detect or self-determine its own optical node status and/or related information pertaining to its optical operations. Additionally, the in-common node 300 may detect and/or directly determine at least some of the optical node statuses and/or related information pertaining to other optical nodes, for example, when an expected heartbeat message from another optical node is not received by the in-common node 300. For example, the in-common node 300 may include a first set of sensors 322a which operate to sense or detect various conditions or characteristics (or lack thereof) of or related to its own optical node status, incoming optical signals, upstream optical components, outgoing optical signals, and/or downstream optical components. For instance, the first set of sensors 322a may, via optical interfaces 302, 318, detect the presence or absence of upstream and/or downstream optical paths, link qualities, disconnections, measurements of characteristics of the optical signals, and/or other types of conditions. The first set of sensors 322a may include hardware, firmware, and/or software sensors, if desired.

Still, the in-common node 300 may obtain some of the optical node statuses and/or related information pertaining to other optical nodes from transmissions generated by other wireless nodes within the network 140 and received at the in-common node 300 via the wireless interface 325 and the wireless overlay network 140. For example, the in-common node 300 may receive, from a first wireless node of the network 140, messages or signals indicative of optical statuses and/or related information of a second wireless node when the first wireless node is communicatively disposed, within the wireless network 140, between the second wireless node and the in-common node 300, and the in-common node 300 is communicatively disposed, within the wireless network 140, between the first wireless node and the one or more servers. In this example, the first wireless node and the in-common node 300 may serve as hops in the delivery of the optical node statuses and/or related information of the second wireless node towards the one or more servers 130 via the wireless overlay network 140. Accordingly, the in-common node 300 may receive, via the wireless overlay network 140 from other wireless nodes of the network 140, optical connectivity statuses and/or related information of various other optical nodes, and may forward, via the wireless overlay network 140 and towards the one or more servers 130 and/or other target destinations, the received optical connectivity statuses and/or related information of the various other optical nodes towards the one or more servers 130 and/or other target destinations.

To this end, upon receiving optical node statuses and/or related information via wireless interface 325, the in-common node 300 may invoke the wireless route determiner 338 to select one or more next wireless nodes to which the in-common node 300 is to forward or transmit the received optical node statuses and/or related information and/or is to transmit its own current optical node status and/or related information. Said another way, the wireless route determiner 338 may determine the one or more next hops (e.g., the wireless network nodes corresponding to the one or more next hops) in the delivery of optical node statuses and/or related information via the wireless overlay network 140 towards the one or more servers 130 and/or target destinations. In an embodiment, the wireless route determiner 338 may select the wireless network nodes corresponding to the one or more next hops based on statuses of one or more wireless network nodes which are maintained and stored by the in-common node 300 in data store 342.

In an example embodiment, the data store 342 may store indications of one or more other wireless nodes of the wireless overlay network 140 and the corresponding wireless node statuses, within the wireless network 140, of each of the indicated wireless nodes, and the wireless route determiner 338 may adjust the routing of optical nodes statuses and/or related information towards the servers 130 and/or target destinations based on the wireless node statuses stored in the data store 342. Wireless node statuses (also referred to herein as wireless routing statuses) of wireless nodes of the network 140 may be indicative of the ability of wireless nodes to route information via the wireless overlay network 140, and may include, for example, "normal," "active," "inactive," "out-of-service," "unresponsive," "congested," and/or other desired categories of wireless routing statuses. The wireless route determiner 338 may monitor the wireless nodes statuses of one or more other wireless nodes of the wireless overlay network 140 and update current wireless node statuses stored in the data store 342 based on the monitoring. For example, the in-common node 300 may include and utilize a second set of sensors 322b to perform at least a portion of the monitoring. The second set of sensors 322b may operate to sense or detect various conditions or characteristics (or lack thereof) of or related to the wireless node status of the in-common node 300 and/or of incoming wireless signals. For instance, the second set of sensors 322b may, via the wireless interface(s) 328, detect or measure the signal-to-noise ratios, data fidelity, and/or other characteristics of received wireless signals, link capacities and other link qualities, and/or other types of conditions of the wireless mesh network 140. Additionally, the second set of sensors 322b may detect/measure conditions associated with other wireless nodes (e.g., heartbeat messages, timing of expected responses, etc.). The second set of sensors 322b may also detect on-board conditions of the in-common node which may affect wireless connectivity of the in-common node 300, such as loading and/or congestion of on-board resources of the node 300. The second set of sensors 322b may include hardware, firmware, and/or software sensors, if desired.

In some situations, the wireless route determiner 338 of the in-common node 300 may query a neighboring wireless node to obtain the current wireless node/routing statuses of the neighboring wireless node and optionally of one or more other wireless nodes which the neighboring wireless node is monitoring, and the wireless route determiner 338 may update the data store 342 in accordance with the response to the query. Additionally or alternatively, the in-common node 300 may receive, from a neighboring wireless node (e.g., via an unsolicited a point-to-point, point-to-multipoint, or broadcast transmission), an indication of a current wireless node/routing status of the neighboring wireless node and/or optionally of respective current wireless node/routing statuses of one or more other wireless nodes (e.g., as known to or maintained by the neighboring wireless node), and the wireless route determiner 338 may update the current wireless node/routing statuses stored in the data store 342 based on the received wireless node/routing status information. In an embodiment, whether by active query and/or by unsolicited or passive reception, the wireless route determiner 338 monitors and maintains a respective current wireless node/routing status of one or more immediate neighboring nodes, e.g., those nodes with which the in-common node 300 has a direct (e.g., a one-hop or single hop) wireless connection, e.g., via a respective direct wireless link. In some embodiments, the wireless route determiner 338 may monitor and maintain respective current wireless node/routing statuses of wireless nodes which are at least two hops away from the in-common node 300.

In a similar vein, the wireless route determiner 338 of the in-common node 300 may respond to queries of other wireless nodes for the wireless node or routing status of the in-common node 300 and optionally of at least some of the other wireless nodes whose current wireless node/routing statuses are being maintained in the data store 342 of the in-common node. Additionally or alternatively, the wireless route determiner 338 may initiate (e.g., not in response to any query of other wireless nodes) the transmissions of the wireless node/routing status of the in-common node 300 and optionally of at least some of the other wireless nodes whose current wireless node/routing statuses are being maintained in the data store 342, e.g., in a point-to-point, point-to-multipoint, and/or broadcast manner over the wireless overlay network 140. Such transmissions of wireless node/routing statuses may be initiated by the wireless route determiner 338 periodically, non-periodically over time, responsively to the occurrence of some trigger event (other than queries from other wireless nodes), and/or otherwise as and when desired.

In an embodiment, at least some of the wireless nodes of the wireless overlay network 140 (e.g., whether such wireless nodes are in-common nodes or are wireless-only nodes which are not a part of the passive optical network 100) may locally maintain or store current wireless node/routing statuses of at least one other wireless node (e.g., in a respective data store 342) and may utilize the stored wireless node/routing statuses to route wireless messages that the wireless node transmits via the wireless overlay network 140. Such wireless messages may include indications of optical nodes statuses and/or information related thereto, and/or such wireless messages may include indications of wireless node statuses and/or information related thereto. Typically, such transmitted messages include an indication of a respective destination node (which may be, for example, the one or more servers 130 or some other target destination such as an intermediate wireless node at which wireless node/routing statuses are collected and aggregated), and each wireless node may transmit such messages towards the respective destination node indicated in the received messages based on the stored wireless node/routing statuses of other wireless nodes. In an embodiment, a majority of the wireless nodes included in the wireless overlay network 140 maintain wireless node/routing statuses of at least one other wireless node and utilize the maintained statuses to route messages towards the messages' end-destinations. In an embodiment, all of the wireless nodes included in the wireless overlay network 140 maintain wireless node/routing statuses of at least one other wireless node and utilize the maintained statuses to route messages towards the messages' end-destinations. As such, the wireless overlay network 140 may operate as a wireless mesh network which is at least partially self-organizing with respect to message routing. Indeed, in some embodiments, the wireless overlay network 140 may operate as a self-organizing wireless mesh network, where each node of the plurality of nodes of the network 140 is configured to dynamically monitor and adjust, based on respective statuses of one or more other nodes of the wireless mesh network, a routing of messages via the self-organizing wireless mesh network.

With particular regard to the wireless devices 328 with which the in-common node 300 communicates via the wireless interface(s) 325, and to bolster the security of the PON 100, the in-common node 300 and a wireless device 328 may be paired together prior to communicating therebetween via the wireless interface 325. Further, the wireless device 328 may be authenticated and/or authorized to wirelessly communicate with the in-common node 300, and/or to wirelessly communicate via a wireless network of which both the in-common node 300 and the wireless device 328 are wireless nodes, e.g., the wireless network 140. As such, the computer-executable instructions 340 executing at the in-common node 300 may include instructions that are executable to pair, authenticate, and/or authorize the wireless device 328 with the in-common node 300 and/or with a wireless network of which the wireless device 328 and the in-common node 300 are wireless nodes. Still further, in some situations, the computer-executable instructions 340 executing at the in-common node 300 may additionally or alternatively include instructions that are executable to authenticate and/or authorize one or more applications or routines executing at the wireless device 328 with the in-common node 300. For example, a graphical user interface (GUI) and/or an augmented reality (AR) application executing at a wireless device 328 which is a portable agent device may be authenticated and/or authorized to communicate with the in-common node 300 via a wireless link supported by the wireless interface 325. It is noted that a wireless device 328 may be proximally located to the in-common node 300 (e.g., at the location of the LMTU serviced by the in-common node 300), or a wireless device 328 may be remotely located to the in-common node 300 and may communicatively connect to the in-common node 300 via the wireless network 225 and optionally other networks. Accordingly, the pairing, authenticating, and/or authorizing of the wireless device 328 and/or of applications executing on the wireless device 328 may be performed for the wireless device 328 and/or for the application(s) executing on the wireless device 328 as needed. For example, while a remotely located wireless device 328 itself may not need to be paired with and authenticated/authorized with the in-common node 300, an application executing on the remotely located wireless device 328 may be authenticated and/or authorized to communicate with the in-common node 300.

Figure 4:
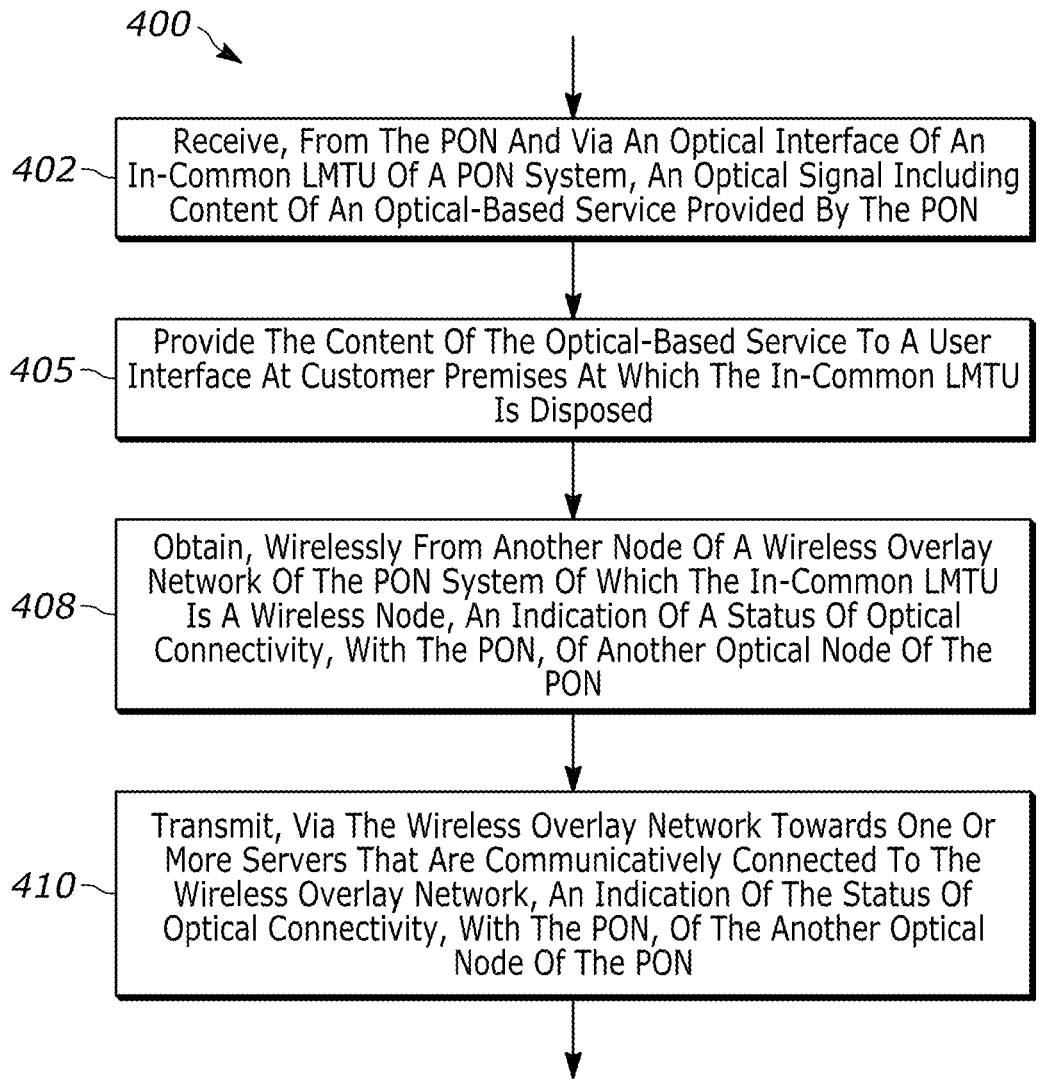
FIG. 4 is a flow diagram of an example method at a last mile termination unit that is an in-common node of a PON system.

FIG. 4 depicts a flow diagram of an example method 400 at an LMTU of a PON system that is an in-common node of the PON system, such as one of the LMTUs 106a, 106(n–1), or 106n. In an embodiment, at least a portion of the method 400 may be executed by respective instances of one or more components of the in-common LMTU, such as the optical network information deliverer 335, the wireless route determiner 338, and/or the instructions 340 of the in-common LMTU. For ease of illustration, and not for limitation purposes, the method 400 is described with simultaneous reference to the example in-common node 300 depicted in FIG. 3 and the LMTU 106n of the example PON system 10 of FIG. 1A. However, it is understood that any one or more portions of the method 400 may be executed in LMTUs that are operating as in-common nodes other than the LMTU 106n, the method 400 may be executed in an in-common node other than the in-common node 300, and/or the method 400 may be utilized in systems other than the example PON system 10. Additionally, in embodiments, at least a portion of the method 400 may operate in conjunction with at least a portion of one or more other methods described herein. Further, in some embodiments, the method 400 may include additional and/or alternate blocks other than those depicted in FIG. 4.

At a block 402, the method 400 may include receiving, at an LMTU that is an in-common node of a PON system, an optical signal including content of an optical-based service provided by the PON. For example, referring to FIGS. 1A and 3, the in-common LMTU 106n may receive, from the PON 100 via network-facing optical interface 302 and optical fiber 305, an optical signal in which content of an optical-based service provided by the PON 100 of the PON system 10 is included.

The content of the optical-based service may be for consumption, e.g., via the LMTU 106n, by a customer of the provider of the PON system 10. As such, at a block 405, the method 400 may include providing, by the in-common LMTU 106n, the content of the optical-based service to a user interface at the customer location 108n at which the LMTU 106n is disposed. For example, the content of the optical-based service may be provided to a user interface of the LMTU 106n, and/or the content of the optical-based service may be provided to a user interface of a personal electronic device that is communicatively connected to the LMTU 106n and disposed at the customer location 108n, e.g., a smart phone or device, a tablet, a computing device, a television, etc.

As the in-common LMTU at which the method 400 is performed is a node of both the optical network and the wireless overlay network of the PON system, at a block 408, the method 400 may include obtaining, at the in-common LMTU from another node of the wireless overlay network and via a wireless interface or transceiver of the in-common LMTU, an indication of a status of optical connectivity, with the PON, of another or second optical node of the PON. The second optical node may or may not be another in-common node of the PON system, and the second optical node may or may not be another LMTU of the PON of the PON system. For example, referring to FIG. 1A, the LMTU 106*n* may receive, via the wireless network 140 and the wireless interface 325 of the LMTU 106*n*, an indication of a status of optical connectivity with the PON 100 of the in-common LMTU 106*a*. For instance, the LMTU 106*n* may receive, via the wireless overlay network 140 and its wireless transceiver 325, a point-to-point message or a broadcast message in which the optical status of the LMTU 106*a* is indicated. The LMTU 106*n* may receive the message via a wireless link that directly and communicatively connects the LMTU 106*n* and the LMTU 106*a*, or the LMTU 106*n* may receive the message via an intermediate node of the wireless overlay network 140 that is communicatively disposed between the LMTU 106*a* and 106*n*, such as the LMTU 106(n−1).

At a block 410, the method 400 may include transmitting, via the wireless transceiver of the in-common LMTU and the wireless network towards the one or more servers of the PON system that are communicatively connected to the wireless network, an indication of the status of the optical connectivity, with the PON 100, of the second optical node. For example, the LMTU 106*n* may transmit or forward, towards the one or more servers 130 over the wireless network 140, the received or obtained message in which the optical status of the LMTU 106*a* was included, or the LMTU 106*n* may generate and transmit, towards the one or more servers 130 over the wireless network 140, a new (e.g., not forwarded) message in which the received optical status of the LMTU 106*a* is included. For instance, the LMTU 106*n* may consolidate, into a new message, an indication of the received optical status of the LMTU 106*a* in conjunction with indications of other optical nodes' optical statuses and/or in conjunction with other information related to optical components status and operations within the PON 100, and subsequently may transmit the new message towards the one or more servers 130 via the wireless network 140. In some implementations, the LMTU 106*n* may transmit the indication of the optical status of the LMTU 106*a* to the one or more servers 130 via a tunnel (e.g., an Internet Protocol (IP) tunnel) that is established between the LMTU 106*n* and the one or more servers 130 over the wireless network 140. In some situations, the LMTU 106*n* may transmit the indication of the optical status of the LMTU 106*a* to another wireless node of the network 140 to advance the delivery of the optical status of the LMTU 106*a* towards the one or more servers 130 via the wireless network 140. The another wireless node may be, for example, a wireless-only node of the wireless network 140 or may be an in-common node of the PON system 10, such as an in-common node in which an Optical Line Terminal (OLT), a Fiber Distribution Hub (FDH), a Fiber Distribution Terminal (FDT), or a Network Interface Device (NID) of the PON 100 is included.

In an embodiment (not shown), the method 400 further includes transmitting an indication of a current status of optical connectivity, with the PON, of the in-common node at which the method 400 is being executed, e.g., to the one or more servers 130 over the wireless overlay network 140. For example, the LMTU 106*n* may transmit, via wireless transceiver 325 and wireless network 140, an indication of its current optical operational and/or connectivity status connectivity with the PON 100. The LMTU 106*n* may transmit an indication of its current optical status(es) periodically, non-periodically over time, on demand, and/or upon detecting a change in the LMTU 106*n*'s current status of optical operational and/or connectivity status within the PON 100. For example, upon the completion of applying an update to the LMTU 106*a*, the LMTU 106*n* may transmit, via the wireless network 140, an indication of its current optical operational status of "updated" to the one or more servers 130. Subsequent to the transmission of the "updated" status to the one or more servers 130, the LMTU 106*a* may transmit, via the wireless network 140 and/or via the optical network 100 to the one or more servers 130, a request to reboot the LMTU 106*n*. In another example, the LMTU 106*n* may detect a partial, intermittent, or total loss of optical connectivity of the LMTU 106*n* with the PON 100 and, upon the detection of the loss of the optical connectivity, the LMTU 106*n* may transmit, via the wireless transceiver 325 and the wireless mesh network 140 towards the one or more servers 130, an indication of a current optical connectivity status which is indicative of the detected loss of the optical connectivity of the LMTU 106*n* with the PON 100. In some embodiments, when the loss of optical connectivity is with respect to a specific optical network of a plurality of different optical networks serviced by the LMTU 106*n*, the method 400 may further include transmitting an indication of a specific optical network of the plurality of optical networks with which the LMTU 106*n* has lost optical connectivity.

In some embodiments, the wireless overlay network 140 in which the in-common LMTU is included is a self-organizing wireless mesh network. Accordingly (and not shown in FIG. 4), the method 400 may further include monitoring, by the in-common LMTU 106*n* and via the self-organizing wireless mesh network 140, respective statuses of communicative connectivity within the self-organizing wireless mesh network 140 of one or more other wireless nodes of the self-organizing wireless mesh network 140, and routing the indication of the status of optical connectivity, with the PON, of the of the another optical node towards the one or more servers 130 based on the monitoring. For example, the in-common LMTU 106*n* may monitor, via the wireless mesh network 140, respective wireless node statuses of immediate neighbor wireless nodes and/or other wireless nodes included in the self-organizing wireless mesh network 140. In an embodiment, monitoring the respective statuses of wireless communicative connectivity of other wireless nodes may include receiving, from at least one other node of the self-organizing wireless mesh network 140 and via wireless interface 325, an indication of at least some of the respective statuses of the communicative connectivity, within the wireless mesh network 140, of the one or more other nodes of the self-organizing wireless mesh network 140. Such statuses may be received at the in-common LMTU 106*n* responsive to a query for such statuses issued by the in-common LMTU 106*n*, and/or such statuses may be received in an ad-hoc or unsolicited manner, such when other wireless nodes broadcast or otherwise independently initiate the transmission of an indication of a (change in) wireless node connectivity status of one or more other wireless nodes of the self-organizing wireless mesh network 140. The in-common LMTU 106*n* may store indications of the received wireless node statuses, such as in data store 342, and the in-common LMTU 106*n* may utilized the stored 342 wireless node statuses to determine a respective route (e.g., to determine a respective wireless node or a respective next-hop) via which a message transmitted from the in-common LMTU 106*n* is to be delivered, e.g., towards the one or more servers 130. As such, the in-common LMTU 106*n* may at least partially determine or organize the route via which messages (in which optical node statuses and/or other information related to optical node and/or PON operations may be included) are delivered over the self-organizing wireless mesh network 140, e.g., towards the one or more servers 130 and/or to other destinations. Further, in some scenarios, the in-common LMTU 106n may transmit a current status of its own wireless communicative connectivity (and optionally respective current statuses of other wireless nodes' wireless communicative connectivities) within the self-organizing wireless mesh network 140) to one or more other wireless nodes so that the other wireless nodes may determine or organize routes via which the other wireless nodes transmit messages across the self-organizing wireless mesh network 140 based on the wireless node statuses that the other wireless nodes receive.

Figure 5:
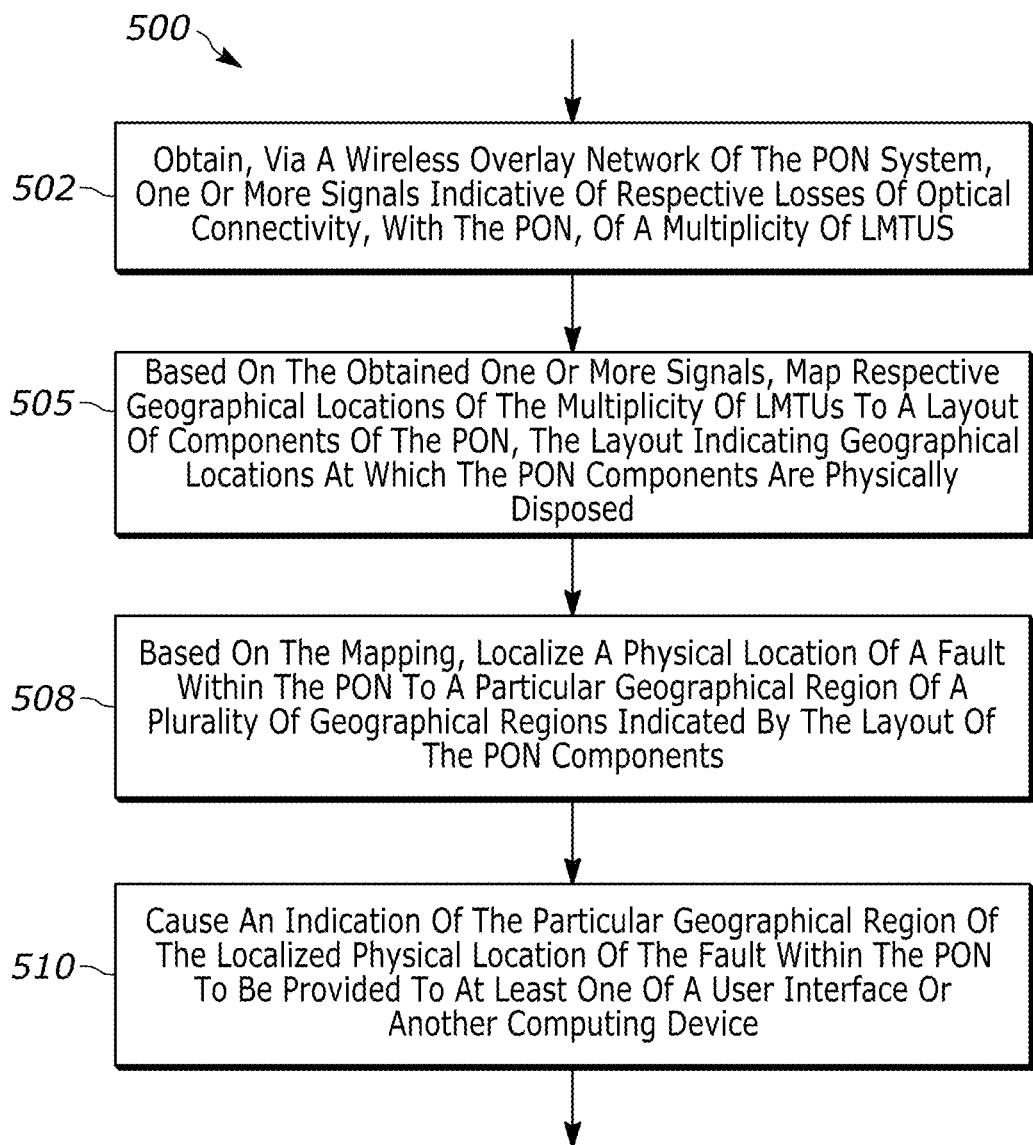
FIG. 5 is a flow diagram of an example method for localizing faults within a PON.

FIG. 5 depicts a flow diagram of an example method 500 for localizing faults within a Passive Optical Network (PON), such as the PON 100 of FIG. 1A or the PON 200 of FIG. 2. In an embodiment, at least a portion of the method 500 may be executed by the one or more servers 130 and/or the computing device 125 of FIG. 1A. In an embodiment, at least a portion of the method 500 may be executed by the one or more servers 230 of FIG. 2. For example, the fault localizer 150 stored on the one or more servers 130 and/or the one or more servers 230 may execute or operate to cause the one or more servers 130 or the one or more servers 230 to perform at least a portion of embodiments of the method 500. For ease of illustration, and not for limitation purposes, the method 500 is described with simultaneous reference to the example PON system 10 of FIG. 1A and the example in-common node 300 depicted in FIG. 3, although it is understood that any one or more portions of the method 500 may be utilized in systems other than the example PON system 10 and in conjunction with other type of in-common nodes other than the example in-common node 300. Additionally, in embodiments, at least a portion of the method 500 may operate in conjunction with at least a portion of one or more other methods described herein. Further, in some embodiments, the method 500 may include additional and/or alternate blocks other than those depicted in FIG. 5.

In an embodiment, the method 500 is executed at one or more servers which are communicatively connected to a wireless mesh network overlaying a PON, where the wireless mesh network may include a plurality of wireless nodes, and the plurality of wireless nodes may include a plurality of last mile termination units of the PON. For example, at least a portion of the method 500 may be executed at the one or more servers 130 or the one or more servers 230 communicatively connected to the wireless mesh network 140 overlaying the PON 100, and the wireless mesh network 140 may include a plurality of in-common LMTUs of the PON, such as the in-common LMTUs 106a, 106(n−1), and 106n. Each of the in-common LMTUs may be configured to, upon a detection of a loss of optical connectivity of the each in-common LMTU (e.g., of itself) with the PON, transmit, via the wireless mesh network, a signal indicative of the loss of optical connectivity of the each last mile termination unit with the PON, such as in manners described elsewhere within this disclosure.

At a block 502, the method 500 may include obtaining, via the wireless network of the PON system, one or more signals indicative of respective losses of optical connectivity, with the PON, of a multiplicity of LMTUs. For example, the one or more servers 130 may obtain, via the wireless network 140 of the PON system 10, multiple signals indicative of losses of optical connectivity, with a PON 100 of the PON system 10, of two or more of the LMTUs 106a-106n and 107a-107m. The losses of optical connectivity may include, for example, total, partial, and/or intermittent losses of optical connectivity, and in some cases, additional information related to the losses of optical connectivity, such as described elsewhere herein. Each signal of the multiple signals may pertain to one or more LMTUs of the PON 100 which have lost optical connectivity with the PON 100. The one or more signals may be received at or otherwise obtained by the one or more servers 130 via point to point, point to multipoint, or broadcast transmissions of one or more other wireless nodes of the network 140, for example. In some implementations, at least some of the one or more signals may be received at the one or more servers 130 via one or more Internet Protocol (IP) tunnels that have been established over the wireless mesh network. In configurations in which the PON 100 supports a plurality of optical networks of different wavelength bands, the indications of the respective losses of optical connectivity of the multiplicity of LMTUs may indicate the corresponding optical networks in which the respective losses were detected. At least some of the signals may include an indication (such as a timestamp) corresponding to or indicative of when a respective loss of optical connectivity was detected at a respective, affected LMTU. Additionally or alternatively, at least some of the signals may include an indication of a path or a route, within the wireless network, via which an indication of a loss of optical connectivity of a respective LMTU was delivered from the respective LMTU to the one or more servers 130. In some embodiments, the obtaining 502 may also include obtaining one or more signals indicative of respective losses of connectivity, with the PON, of one or more other PON components, such as OLTs, FDHs, FDTs, and/or NIDs, e.g., in manners similar to those discussed above with losses of optical connectivity of LMTUs.

At a block 505, the method 500 may include, based on the obtained one or more signals, mapping the indicated multiplicity of last mile termination units indicated in the obtained signals to a layout of components of the PON (e.g., a layout of an entirety of the optical components of the PON), which may be stored in the data store 132, for example. The layout of components of the PON may indicate a network-view of PON components and their respective interconnections, and may be in a textual and/or graphical format. Typically, at least a portion of the layout of PON components is populated during the installation, activation, and/or updating of various PON components. For example, and referring to FIG. 2, a layout of the components of the PON 200 of the PON system 20 may indicate that the primary optical fiber or span 212b interconnects the OLT$_2$ 205b and the FDH$_2$ 202b, and that the secondary optical fiber or span 220d interconnects the FDH$_2$ 202b and the LMTU 210d. The layout may further provide, for example, identifications of the respective components, lengths of optical fibers or spans, geographical distances between PON components, and the like. In some embodiments, the mapping 505 may be based on the Global Positioning System (GPS) or other type of geospatial coordinates of at least some of the installed PON components (or, in the case of optical fibers, of the endpoints of the optical fibers and various intermediate GPS coordinates along the lengths of the optical fibers). For example, when a particular PON component is installed, the geospatial coordinates of the particular PON component's installed location may be stored in the data store 132, and the subsequently occurring mapping 505 may include accessing the data store 132. For instance, in some implementations, the geospatial coordinates of the particular PON component may be stored the data store 132 in conjunction with the layout. Additionally or alternatively, in some situations, the geospatial coordinates of one or more PON components may be obtained in conjunction with the obtaining 502 of the one or more signals. For example, an LMTU that originates an indication of a detected loss of optical connectivity at the LMTU may transmit its geospatial coordinates along with the indication of the detected loss via the wireless network 140 towards the one or more servers 130, and eventually the one or more servers 130 may receive a corresponding indication of the detected loss of optical connectivity at the LMTU and an indication of the geospatial coordinates of the LMTU.

At a block 508, the method 500 may include, based on the mapping, localizing or narrowing a physical location of a fault within the PON to a particular geographical region of a plurality (e.g., an entirety) of geographical regions indicated by the layout of the components of the PON. Localizing the physical location of the fault may include narrowing the possibilities of the physical location the fault to only one of a plurality of geographical regions serviced by the PON, where the localized physical location or geographical region may be a neighborhood, a section of the neighborhood, a street, a block of the street, etc. For example, as shown in FIG. 1B, the map 160 depicts multiple geographical regions 168a, 18b, 186c, and 168d, and the physical location of the fault 165 has been localized to the geographical region 168c. Indeed, in the example shown in FIG. 1B, the physical location of the fault has been localized or narrowed down to the physical location 165 depicted by the X. In some situations, at the block 508, the physical location of the fault may be localized or narrowed down to a particular span of optical fiber, a particular OLT, or a particular LMTU. In some PONs, the localizing 508 of the physical location of the fault within the PON 100 may not only be based on the mapping 505, but may be further based on a particular optical network of a plurality of optical networks that are supported by the PON 100 and that utilize different optical wavelength bands. In these implementations, the localizing 508 may include localizing the physical location of a fault that compromises optical connectivity via a particular optical wavelength band of the plurality of optical wavelength bands supported by the PON 100.

Further, in some embodiments, the localizing 508 of the physical location of the fault may be further based on least one of: data generated by gap-loss attenuators and/or other types of testing and/or characterizing components of the PON 100; respective GPS coordinates or locations of at least some of the components of the PON 100; installation, maintenance, abnormality, and/or other types of historical records of the PON 100; and/or other types of data associated with the PON system 10. In an example, the localizing 508 may be further based on a plurality of timestamps which were included in the obtained 502 one or more signals, and/or the localizing 508 may be further based on a plurality of routes, within the wireless network 140, of deliveries of indications of losses of optical connectivity which were indicated in the obtained 502 one or more signals. In an example, the localizing 508 may be based on geospatial coordinates of one or more PON components, where at least some the geospatial coordinates may be obtained from the data store 132, and/or at least some of the geospatial coordinates may be obtained in conjunction with the obtaining 502 of the one or more signals.

At a block 510, the method 500 may include causing an indication of the particular geographical region of the localized physical location of the fault within the PON to be provided to at least one of a user interface or another computing device. For example, the one or more servers 130 may cause the indication of the particular geographical region of the localized physical location of the fault within the PON to be provided to a user interface of the one or more servers 130, of the computing device 125, and/or of another computing device, which may be disposed remotely from the PON system 10, in some scenarios. The indication of the particular geographical region and/or the localized physical location may be presented on the user interface in any desired format, e.g., text, graphical, auditory, etc. For example, a graphical indication of the localized physical location may be presented on a graphical, geographical map of streets, neighborhoods, cities, etc. provided by a graphical mapping application via the user interface. In some situations, the graphical mapping application may also provide routing directions (e.g., driving, walking, etc.) to guide a user to the localized physical location of the fault. In some embodiments, additional information may be provided, to the user interface or other computing device, along with the indication of the particular geographical regions and/or the localized physical location. For instance, when the physical location of the fault has been localized 508 to a particular span of optical fiber (e.g., due to a fiber cut), to a particular FDH, or to a particular optical terminal, an identifier of the particular span, particular FDH, or particular optical terminal and optionally associated information (e.g., model and serial numbers, the particular optical network associated with the fault, maintenance and installation records, service call records, operating and/or performance data logs, user manuals, and the like) may be provided to the user interface and/or other computing device along with the indication of the particular geographical region and/or the localized physical location of the fault.

In some embodiments, the method 500 may cause an instruction to dispatch an agent of the PON 10 to the particular geographical region and/or the localized physical location of the fault to be provided to the user interface and/or the another computing device. For example, the one or more servers 130 may send the instruction to dispatch the agent along with the indication of the particular geographical region and/or the localized physical location of the fault to a dispatching application. If desired, the dispatch instructions may also include information associated with the localized physical location of the fault, e.g., model and serial numbers of equipment, the particular optical network associated with the fault, maintenance and installation records, service call records, operating and/or performance data logs, user manuals, and the like.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. A system for fault localization in a Passive Optical Network (PON), the system comprising:
   one or more servers communicatively connected to a wireless mesh network overlaying the PON, the wireless mesh network including a plurality of nodes, the plurality of nodes including a plurality of last mile termination units of the PON configured to transmit, via the wireless mesh network, one or more signals indicative of a loss of optical connectivity of at least some of the plurality of last mile termination units with the PON, and
   the one or more servers configured to:
      obtain, via the wireless mesh network, the one or more signals indicative of the loss of optical connectivity of the at least some of the plurality of last mile termination units with the PON; and
      cause an indication of the loss of optical connectivity of the at least some of the plurality of last mile termination units with the PON to be provided to at least one of a user interface or another computing device.

2. The system of claim 1, wherein the one or more servers are further configured to:
   determine a particular geographical area, of a plurality of geographical areas serviced by the PON, in which a fault causing the loss of optical connectivity of the at least some of the plurality of last mile termination units with the PON is located; and
   cause an indication of the particular geographical area to be provided to the least one of the user interface or the another computing device.

3. The system of claim 2, wherein the PON supports a plurality of optical wavelength bands, the fault corresponds to a particular optical wavelength band of the plurality of optical wavelength bands, and the one or more servers are further configured to cause an indication of the particular optical wavelength band to be provided to the at least one of the user interface or the another computing device.

4. The system of claim 2, wherein a physical location of the fault is at an optical fiber, a span of the optical fiber, a Fiber Distribution Hub (FDH), or a terminal of the PON, and the one or more servers are further configured to cause an indication of an identifier of the optical fiber, the span of the optical fiber, the FDH, or the terminal of the PON to be provided to the at least one of the user interface or the another computing device.

5. The system of claim 2, wherein the one or more servers are further configured to determine a particular component of the PON that is disposed within the particular geographical area and at which the fault causing the loss of optical connectivity of the at least some of the plurality of last mile termination units with the PON occurred; and
   cause an indication of the particular component to be provided to the least one of the user interface or the another computing device.

6. The system of claim 2, wherein:
   each signal of the one or more signals indicative of loss of optical connectivity of the at least some of the plurality of last mile termination units includes an indication of at least one of: (i) a timestamp corresponding to a detection of a loss of optical connectivity of a respective last mile termination unit, or (ii) a route, within the wireless mesh network, via which an indication of the loss of optical connectivity of the respective last mile termination unit was delivered from the respective last mile termination unit to the one or more servers; and
   the determination of the particular geographical area is based on the at least one of the timestamps or the routes indicated by the one or more signals.

7. The system of claim 2, wherein the determination of the particular geographical area is based on a layout of components of the PON, the layout indicating interconnections between the components of the PON, and the components of the PON including the at least some of the plurality of last mile termination units.

8. The system of claim 2, wherein the one or more servers are further configured to cause a dispatch of an agent of the PON to the particular geographical area.

9. The system of claim 1, wherein the indication of the loss of optical connectivity of the at least some of the plurality of last mile termination units with the PON is provided to the at least one of the user interface or the another computing device via the wireless mesh network.

10. The system of claim 1, wherein the indication of the loss of optical connectivity of the at least some of the plurality of last mile termination units with the PON is provided to the at least one of the user interface or the another computing device via one or more optical fibers servicing the plurality of last mile termination units.

11. The system of claim 1, wherein:
the plurality of nodes of the wireless mesh network further includes one or more components of the PON,
the one or more PON components including at least one of: an Optical Line Terminal (OLT), a Fiber Distribution Hub (FDH), a Fiber Distribution Terminal (FDT), or a Network Interface Device (NID); and
the one or more servers are further configured to obtain, via the wireless mesh network, a signal indicative of a loss of optical connectivity of a PON component included in the one or more PON components, and cause an indication the loss of optical connectivity of the PON component to be provided to the at least one of the user interface or the another computing device.

12. The system of claim 1, wherein each node of the plurality of nodes is further configured to obtain, from a first another node, an indication of respective losses of optical connectivity of at least one of the first another node or a second another node, and to cause the indication of the respective losses of the optical connectivity of the at least one of the first another node or the second another node to be provided to the at least one of the user interface or the another computing device.

13. The system of claim 12, wherein the indication of the respective losses of the optical connectivity of the at least one of the first another node or the second another node is transmitted by the each node to one or more neighboring nodes to thereby cause the indication to be provided to the at least one of the user interface or the another computing device.

14. The system of claim 1, wherein at least one of:
the plurality of nodes of the wireless mesh network further includes one or more other last mile termination units that have inactive optical connections with the PON;
at least one node of the plurality of nodes includes a software defined radio; or
at least one last mile termination unit of the plurality of last mile termination units includes or is communicatively connected to a respective software defined radio.

15. The system of claim 1, wherein at least one of:
the wireless mesh network is a self-organizing wireless mesh network; or
the wireless mesh network supports wireless signals delivered via at least one of: a short-range wireless protocol, a wireless protocol delivered over a 900 MHz band, or a wireless protocol delivered over a 2.4 GHz band.

16. A method for localizing faults within a Passive Optical Network (PON), the method comprising:
obtaining, via a wireless mesh network overlaying the PON and by one or more servers communicatively connected to the wireless mesh network, one or more signals indicative of a loss of optical connectivity, with the PON, of at least some of a plurality of last mile termination units of the PON, the wireless mesh network including a plurality of nodes in which the plurality of last mile termination units are included, each node of the plurality of nodes configured to transmit signals indicative of losses of optical connectivity of components of the PON, and the components of the PON including the plurality of last mile termination units; and
causing, by the one or more servers, an indication of the loss of optical connectivity of the at least some of the plurality of last mile termination units with the PON to be provided to at least one of a user interface or another computing device.

17. The method of claim 16, further comprising:
determining, by the one or more servers, a particular geographical area, of a plurality of geographical areas serviced by the PON, in which a fault causing the loss of optical connectivity of the at least some of the plurality of last mile termination units with the PON is located; and
causing, by the one or more servers, an indication of the particular geographical area to be provided to the least one of the user interface or the another computing device.

18. The method of claim 17, wherein the PON supports a plurality of optical wavelength bands, the fault corresponds to a particular optical wavelength band of the plurality of optical wavelength bands, and the method further comprises causing, by the one or more servers, an indication of the particular optical wavelength band to be provided to the at least one of the user interface or the another computing device.

19. The method of claim 17, wherein a physical location of the fault is at an optical fiber, a span of the optical fiber, a Fiber Distribution Hub (FDH), or a terminal of the PON, and the method further comprises causing, by the one or more servers, an indication of an identifier of the optical fiber, the span of the optical fiber, the FDH, or the terminal of the PON to be provided to the at least one of the user interface or the another computing device.

20. The method of claim 17, further comprising:
determining, by the one or more servers, a particular component of the PON that is disposed within the particular geographical area and at which the fault causing the loss of optical connectivity of the at least some of the plurality of last mile termination units with the PON occurred; and
causing an indication of the particular component to be provided to the least one of the user interface or the another computing device.

21. The method of claim 17, wherein:
each signal of the one or more signals indicative of loss of optical connectivity of the at least some of the plurality of last mile termination units includes an indication of at least one of: (i) a timestamp corresponding to a detection of a loss of optical connectivity of a respective last mile termination unit, or (ii) a route, within the wireless mesh network, via which an indication of the loss of optical connectivity of the respective last mile termination unit was delivered from the respective last mile termination unit to the one or more servers; and
the determining of the particular geographical area is based on the at least one of the timestamps or the routes indicated by the one or more signals.

22. The method of claim 17, wherein the determining of the particular geographical area is based on a layout of components of the PON, the layout indicating interconnections between the components of the PON, and the components of the PON including the at least some of the plurality of last mile termination units.

23. The method of claim 20, further comprising at least one of:
   causing an instruction to dispatch an agent of the PON to the particular geographical area to be provided to the at least one of the user interface or the another computing device; or
   causing a graphical indication of the particular geographical area to be displayed on a graphical map presented on the user interface.

24. The method of claim 16, wherein the indication of the loss of optical connectivity of the at least some of the plurality of last mile termination units with the PON is provided to the at least one of the user interface or the another computing device via the wireless mesh network.

25. The method of claim 16, wherein the indication of the loss of optical connectivity of the at least some of the plurality of last mile termination units with the PON is provided to the at least one of the user interface or the another computing device via one or more optical fibers servicing the plurality of last mile termination units.

26. The method of claim 16, wherein:
   the plurality of nodes of the wireless mesh network further includes one or more components of the PON,
   the one or more PON components including at least one of: an Optical Line Terminal (OLT), a Fiber Distribution Hub (FDH), a Fiber Distribution Terminal (FDT), or a Network Interface Device (NID); and
   the method further comprises obtaining, via the wireless mesh network, a signal indicative of a loss of optical connectivity of a PON component included in the one or more PON components, and causing an indication the loss of optical connectivity of the PON component to be provided to the at least one of the user interface or the another computing device.

27. The method of claim 16, wherein each node of the plurality of nodes is further configured to obtain, from a first another node, an indication of respective losses of optical connectivity of at least one of the first another node or a second another node, and to cause the indication of the respective losses of the optical connectivity of the at least one of the first another node or the second another node to be provided to the at least one of the user interface or the another computing device.

28. The method of claim 27, wherein the indication of the respective losses of the optical connectivity of the at least one of the first another node or the second another node is transmitted by the each node to one or more neighboring nodes to thereby cause the indication to be provided to the at least one of the user interface or the another computing device.

29. The method of claim 16, wherein at least one of:
   the plurality of nodes of the wireless mesh network further includes one or more other last mile termination units that have inactive optical connections with the PON;
   at least one node of the plurality of nodes includes a software defined radio; or
   at least one last mile termination unit of the plurality of last mile termination units includes or is communicatively connected to a respective software defined radio.

30. The method of claim 16, wherein at least one of:
   the wireless mesh network is a self-organizing wireless mesh network; or
   the wireless mesh network supports wireless signals delivered via at least one of: a short-range wireless protocol, a wireless protocol delivered over a 900 MHz band, or a wireless protocol delivered over a 2.4 GHz band.

\* \* \* \* \*